(12) United States Patent
Tabaru

(10) Patent No.: US 8,750,640 B2
(45) Date of Patent: Jun. 10, 2014

(54) IMAGE PROCESSING DEVICE, IMAGE PROCESSING METHOD, AND IMAGE PROCESSING PROGRAM, FOR CORRELATING IMAGES WITH NOISE USING WEIGHTING RELATIVE TO SPATIAL FREQUENCIES

(75) Inventor: Tetsuya Tabaru, Tokyo (JP)

(73) Assignee: Azbil Corporation, Tokyo (JP)

( * ) Notice: Subject to any disclaimer, the term of this patent is extended or adjusted under 35 U.S.C. 154(b) by 647 days.

(21) Appl. No.: 12/960,315

(22) Filed: Dec. 3, 2010

(65) Prior Publication Data

US 2011/0188705 A1 Aug. 4, 2011

(30) Foreign Application Priority Data

Feb. 2, 2010 (JP) ................................. 2010-021265

(51) Int. Cl.
*G06K 9/40* (2006.01)
(52) U.S. Cl.
USPC .......................................................... 382/275
(58) Field of Classification Search
None
See application file for complete search history.

(56) References Cited

U.S. PATENT DOCUMENTS

| 6,016,356 | A  | * | 1/2000 | Ito et al. ........................ 382/132 |
| 6,473,462 | B1 |   | 10/2002 | Chevance et al. |
| 6,535,617 | B1 | * | 3/2003 | Hannigan et al. ............. 382/100 |
| 6,693,965 | B1 | * | 2/2004 | Inoue et al. ............... 375/240.19 |
| 6,763,142 | B2 |   | 7/2004 | Dai et al. |
| 2003/0048957 | A1 | * | 3/2003 | Dai et al. ...................... 382/260 |
| 2008/0226177 | A1 | * | 9/2008 | Yamaguchi et al. .......... 382/199 |
| 2009/0161820 | A1 | * | 6/2009 | Raupach ........................ 378/19 |

FOREIGN PATENT DOCUMENTS

| CN | 1272747 A | 11/2000 |
| CN | 101159063 A | 4/2008 |
| EP | 0480807 A1 | 4/1992 |
| JP | 9-22406 A | 1/1997 |
| JP | 2007-78511 A | 3/2007 |

OTHER PUBLICATIONS

Tetsuya Tahara, (edited by Seiichi Arai and Kazushi Nakano), "Industrial Applications of Wavelet Analysis," Asakura Shoten, p. 9-10 (2005).
Takita Kenji et al. "High-Accuracy Subpixel Image Registration based on Phase-Only Correlation", IEICE Trans. Fundamentals, vol. E-86A, No. 8, Aug. 2003, pp. 1925-1934.
Chinese Office Action, dated Jan. 24, 2013, which issued during the prosecution of Chinese Patent Application No. 201010613106.0, which corresponds to the present application.
Chinese Office Action, dated Sep. 3, 2013, which issued during the prosecution of Chinese Patent Application No. 201010613106.0.

* cited by examiner

*Primary Examiner* — Bhavesh Mehta
*Assistant Examiner* — Andrew Moyer
(74) *Attorney, Agent, or Firm* — Troutman Sanders LLP

(57) ABSTRACT

An image processing device includes an estimating portion and a controlling portion. The estimating portion estimates a frequency component of noise that is included in both the first and second images, and a frequency component of a first image that does not include the noise, based on first image data obtained through imaging, using an imaging device, a first image that includes a specific image pattern, and based on second image data obtained by imaging, using the imaging device, a second image that does not include the specific image pattern. The controlling portion controls weightings, relative to frequencies, when calculating a correlation between the first image data and third image data, obtained through imaging a third image through the imaging device, based on the individual frequency components estimated by the estimating portion.

2 Claims, 25 Drawing Sheets

(A)
Plot of Normalized Correlation (B)
Plot of Phase-Only Correlation

IMAGE PROCESSING DEVICE, IMAGE PROCESSING METHOD, AND IMAGE PROCESSING PROGRAM, FOR CORRELATING IMAGES WITH NOISE USING WEIGHTING RELATIVE TO SPATIAL FREQUENCIES

CROSS REFERENCE TO RELATED APPLICATIONS

The present application claims priority under 35 U.S.C. §119 to Japanese Patent Application No. 2010-021265, filed Feb. 2, 2010, which is incorporated herein by reference.

FIELD OF TECHNOLOGY

The present invention relates to image processing technology for image collating and location detection.

BACKGROUND OF INVENTION

Collating devices for confirming whether or not an object to be processed or an object to be detected is correct, contamination detecting devices, and position detecting devices for controlling positioning are used in detection devices in products and various types of manufacturing equipment for semiconductors and the like.

In these devices, a method is used that is based upon a correlation between images (data). For example, the method is based on the correlation between, for example, an image that has been taken in advance and stored or recorded into memory or the like (hereinafter termed the "stored image") and an image that has been taken as being the subject of collation to the stored image (hereinafter termed the "collation image").

As typical methods that uses correlation, there is a method based on a normalized correlation function, and a method known as the "phase-only correlation method." An example of a pattern collating device that uses the phase-only correlation method is given in Japanese Patent 3930067 ("JP '067"). The phase-only correlation method is used in position detection.

In the phase-only correlation method, both a stored image pattern and, for example, a collation image pattern are subjected to discrete Fourier transforms, and the phase components are extracted while causing all of the amplitudes of the pattern of the individual phase components obtained thereby to be equal to 1. Patterns of the extracted phase components are then composited respectively for the stored image and the collation image, and the composited patterns are subjected to an inverse discrete Fourier transform to obtain a correlation pattern. The image collating and position detection is performed based on the correlation pattern obtained in this way.

The phase-only correlation method, as implied by the name, obtains a correlation pattern that is limited to the information of the phase components, to obtain a strong correlation even if there is some degree of variation in the imaging conditions, such as the light source, or the like. Because of this, when compared to methods based on normalized correlation functions, the phase-only correlation method is known for its high detection sensitivity in collating and high resolution in position detection.

Japanese Unexamined Patent Application Publication 2007-78511 ("JP '511"), for example, describes a method that is an improvement of the phase-only correlation method. In this method, the effect of noise is reduced using frequency weighting based on spatial frequency information in the stored image.

However, in "JP '067", no mention or thought is given to the case wherein the accuracy of the image collating or position detection suffers as a result of the inclusion of noise that is common to both images, known as "fixed pattern noise," such as in the case wherein the stored image and the collation image were imaged by the same image capturing device. "JP '511" has, as the object thereof, reliable collation even when there is some degree of included noise; however, there is insufficient thought given to the properties of the fixed pattern noise, and the effectiveness when fixed pattern noise is included in the images is limited.

One of the objects of the present invention is to enable an improvement in the accuracy of pattern collating and position detection.

Note that there is no limitation to the aforementioned object, and, as another object of the present invention, there is the ability to perform positioning, which is an effect of the operation brought about by the various structures disclosed in the forms for embodying the present invention, described above, effects of operation that cannot be provided through the conventional technology.

SUMMARY OF THE INVENTION

One form of an image processing device according to the present invention includes an estimating portion for estimating, based on first image data obtained through imaging, using an image capturing device, a first image that includes a specific image pattern, and based on second image data, obtained by imaging, using the image capturing device, second image data that does not include the specific image pattern, a frequency component of noise that is included in both the first and second images, and a frequency component of a first image that does not include said noise; and a controlling portion for controlling weighting, relative to frequencies, when calculating a correlation between the first image data and third image data, obtained through imaging a third image through the image capturing device, based on the individual frequency components estimated by the estimating portion.

Here the estimating portion may include a first frequency component analyzing portion for analyzing a frequency component of the first image data; a second frequency component analyzing portion for analyzing a frequency component of the second image data; and a subtracting portion or subtracting the analysis result by the second frequency component analyzing portion from the analysis result by the first frequency component analyzing portion. Wherein the controlling portion may control the weighting based on the subtracting result by the subtracting portion and on the analysis result by the second frequency component analyzing portion.

Additionally, both the first and the second frequency component analyzing portions may each have a Fourier transform portion for performing a Fourier transform on inputted image data; and a squaring calculating portion for calculating a square of the results of the Fourier transform by the Fourier transform portion.

Furthermore, the first and second frequency component analyzing portions may each include a band limiting portion for applying a variable-frequency band limiting process to the input image data; and a sum-of-squares calculating portion for calculating the sum of squares of the band limiting result by the band limiting portion.

Additionally, the band limiting process by the band limiting portion may be a wavelet transform process.

Furthermore, the controlling portion may set a smaller weighting for a frequency wherein the ratio between a frequency component of a first image that does not include noise and a frequency component of that noise is relatively small.

Additionally, the controlling portion may normalize the weightings.

Furthermore, the control of the weightings by the controlling portion may select the maximum frequency wherein the individual ratios of the sum-of-squares results by the sum-of-squares calculating portion exceeds a specific threshold value as a reference frequency for a band limiting process that is performed in a process of calculating a frequency-weighted correlation of the first and third image data.

Additionally, the image processing device may further have a frequency-weighted correlation calculating portion for calculating a correlation between the first image data and the third image data; and a peak detecting portion for detecting a peak of correlations obtained by the frequency-weighted correlation calculating portion.

Moreover, one form of an image processing process according to the present invention includes a process for estimating, based on first image data obtained through imaging, using an image capturing device, a first image that includes a specific image pattern, and based on second image data, obtained by imaging, using the image capturing device, second image data that does not include the specific image pattern, a frequency component of noise that is included in both the first and second images, and a frequency component of a first image that does not include said noise; a process for controlling weighting, relative to frequencies, when calculating a correlation between the first image data and third image data, obtained through imaging a third image through the image capturing device, based on the estimated individual frequency components; a process for calculating a correlation between the first image data and the third image data based on the controlled weightings; and a process for detecting a peak of the calculated correlations.

Moreover, one form of an image processing program according to an example of the present invention is an imaging processing program that can be read by a computer to cause the computer to execute a specific image process through the computer reading the program, to cause the computer to execute:

a process for estimating, based on first image data obtained through imaging, using an image capturing device, a first image that includes a specific image pattern, and based on second image data, obtained by imaging, using the image capturing device, second image data that does not include the specific image pattern, a frequency component of noise that is included in both the first and second images, and a frequency component of a first image that does not include said noise; and a process for controlling weighting, relative to frequencies, when calculating a correlation between the first image data and third image data, obtained through imaging a third image through the image capturing device, based on the estimated individual frequency components.

Here the image processing program may further execute, on a computer, a process for calculating a correlation between the first image data and the third image data based on the weightings that are controlled; and a process for detecting a peak of the correlations that are calculated.

The forms of examples set forth above make it possible to reduce the likelihood of the occurrence of an incorrect detection cause by the inclusion of noise that is common to both the first image and the third image. Consequently, this enables an improvement in the accuracy of image collation and position detection.

DETAILED DESCRIPTION OF THE PRESENT INVENTION

Figure 1:
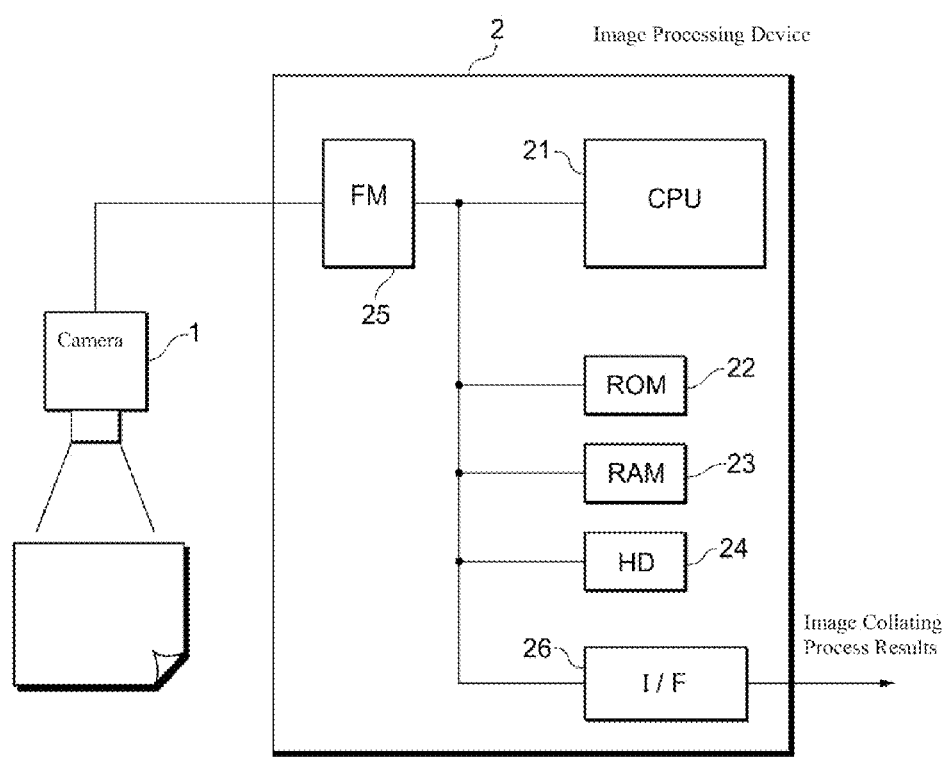
FIG. 1 is a block diagram illustrating one example of an image processing system according to one form of example according to the present invention.

Forms of examples according to the present invention are explained below in reference to the drawings. Note that the forms of examples explained below are merely illustrative, and are not intended to exclude various modifications and technical applications not disclosed below. That is, the present application can be embodied in a variety of forms (combining the various examples of embodiment, etc.) within a scope that does not deviate from the spirit or intent thereof. Additionally, in the descriptions in the drawings below, identical or similar parts are illustrated having identical or similar codes. The diagrams are schematic, and thus do not necessarily reflect actual dimensions, proportions, etc. In the relationship between drawings as well, parts may be included that have different dimensional relationships or proportions.

Example of System Structure

FIG. 1 is a block diagram illustrating one example of an image processing system according to one form of embodiment according to the present invention. The image processing system illustrated in FIG. 1 is, as an example, provided with an image capturing device 1 such as an image sensor, a CCD camera, or the like, and an image processing device 2 for processing data of the image captured by the image capturing device 1 (hereinafter termed "image data").

The image processing device 2 has a function as an image storing device for storing (recording) image data that has been captured by the image capturing device 1 (that is, an image storing function) and/or a function as an image collation processing device for collating stored image data and other image data captured by the image capturing device 1 (an image collating function).

As an example, the image processing device 2 comprises, for example, a CPU (Central Processing Unit) 21, a ROM (Read Only Memory) 22, a RAM (Random Access Memory) 23, a hard disk drive (HD) 24, a frame memory (FM) 25, and an interface (I/F) 26.

The CPU 21 is an example of a computer (a calculation processing portion), and may be embodied using a CPU of an CISC (Complex Instruction Set Computer) type or a RISC (Reduced Instruction Set Computer) type, or by an MPU (MicroProcessing Unit), DSP (Digital Signal Processor), or ASIC (Application Specific processor).

The ROM 22, the RAM 23, the HD 24, and the frame memory 25 are all examples of a storing portion, where various types of data, such as an image processing program, parameters, and the like, for executing image processing according to the present example may be stored in any of the storage areas (such as, for example, the ROM 22). The image processes (program) according to the present example includes an image storing program that causes an image storing process to be executed on a computer, and/or an image collating program that causes an image collating process to be executed on a computer. Note that it does not matter if the storing portion is internal or an external storage device. An SSD (Solid State Drive), flash memory, SRAM (Static Random Access Memory), or the like, may also be used for the storing portion, and if high-speed writing and high-speed reading are not required, then slower magnetic tape devices, optical disk devices, or the like, may also be used.

The image processing program (the image storing program and/or image collating program) may be provided in a form wherein it is recorded on a computer-readable storage medium. Examples of storage media include various types of computer-readable media such as a CD-ROM, a CD-R, a CD-RW, a DVD Blu-ray disk, a magnetic disk, an optical disk, a magneto-optical disk, an IC card, a ROM cartridge, an SSD, and the like. The computer reads the image processing program from the storage medium and transfers it to the hard disk 24 or the RAM 23 as appropriate for storage and use.

Also, the image processing program may be stored in advance in an internal or external storage device such as the RAM 23 or the hard disk 24, or onto a storage medium, and provided to the computer from the storage device or storage medium through a communication circuit such as the Internet.

Here the computer is a concept that includes, for example, hardware and an operating system (OS), and may mean the hardware operating under the control of the operating system. Additionally, in a case wherein it is possible to operate the hardware by the program alone, without the need for an operating system, then that hardware can be considered to be equivalent to a computer. The hardware may include a calculating device such as a CPU, and a reading device able to read a program that is stored on a storage medium.

The image processing program includes program code that achieves, on a computer such as described above, the image storing function and/or image collating function described above. Furthermore, a portion of the functions may be achieved through the operating system, rather than the program.

The ROM 22 is an example of a non-volatile storage medium. The CPU 21 reads the image processing program or data stored in the ROM 22, sets the microcode for the CPU 21, initializes various portions, evokes the operating system, and the like, from the hard drive 24, issues instructions to execute the image processing program, and the like.

The frame memory stores image data captured by the image capturing device 1. The CPU 21 processes, in accordance with the image storing program, the image data stored in the frame memory 25, and then stores it to, for example, the hard disk 24. Stored image data can be used as a template to be referenced at the time of an image collating process. Furthermore, the CPU 21 may match image data stored in the FM 25 and image data stored in, for example, the HD 24, in accordance with the image collating program.

The interface 26 is an external connection interface able to connect to a peripheral device such as a display device, a printing device, or the like, and/or a communication interface able to connect to a network such as a LAN (Local Area Network), a WAN (Wide Area Network), or the like. The external connecting interface provides, for example, a USB interface, an IEEE 1394 interface, a serial interface, a parallel interface, an infrared interface, a wireless interface, or the like. The communication interface may be based on a connection protocol such as in, for example, WiMAX®, C.link®, HDMI®, a wireless/wired LAN, a telephone line, a wireless telephone network, a PHS network, an electric lamp line network, IEEE 1394, or the like.

The image processing device 2 is able to output, for example, image collating results through the external connection interface to a display device, printing device, or the like, and communicate through the communication interface to another image processing device 2, a server, or the like. Consequently, the image processing device 2 is able to provide the image processing program, a portion of various types of data, or the like, to another image processing device 2 that is connected so as to enable communication. One example may be achieved by causing one image processing device 2 to function as an image storing device and another image processing device 2 to function as an image collating device, with an image capturing device 1 located in a location that is remote from that of the image storing process and the image collating process.

Summary of the Image Storing Process and the Image Collating Process

In image collating and position detecting, a stored image may be captured using an image sensor used in pattern collating. To cite one example, in a case wherein a positioning mechanism that uses an image sensor is incorporated as a portion of a manufacturing device or machining device, the image sensor that is included in the device captures not just the collation image, but the stored image as well. For reasons having to do with cost, and the like, it is more desirable to capture the stored image without using separate image capturing devices for image storing and for image collating.

When the stored image and the collation image are captured by the same image sensor, both images will inevitably include noise (patterns) termed "fixed pattern noise," arising from the nature of the image capturing device 1 (for example, an image capturing element). In this case, identical patterns will be included as noise in all of the captured images. Additionally, while the amplitude of the noise is relatively small, it will be distributed throughout the entire scope of the captured images.

Figure 24:
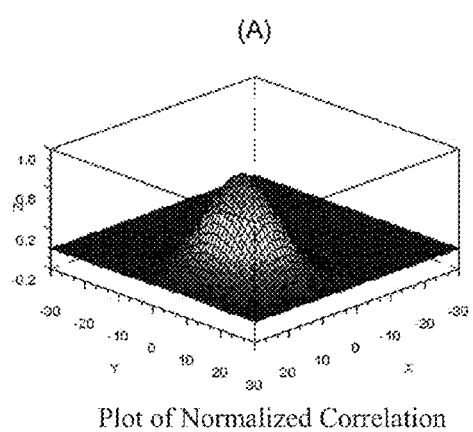
FIG. 24 (A) is a block diagram illustrating one example of a correlation pattern by the normalized correlation method and FIG. 24 (B) is a diagram illustrating one example of a correlation pattern through the phase-only correlation method.
Figure 24:
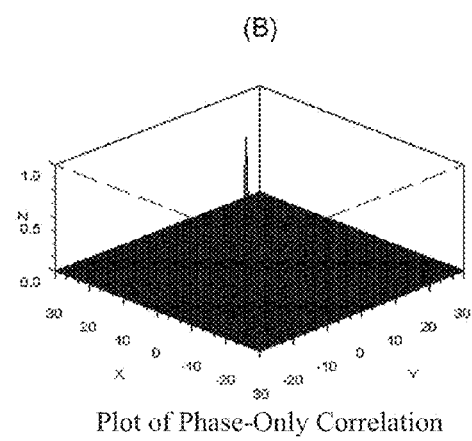

If the phase-only correlation method is used, then due to the high sensitivity and resolving power thereof, there will be a strong reaction to the fixed pattern noise. FIG. 24 (B) shows a comparison of an example of a correlation pattern obtained from the phase-only correlation method to an example of a correlation pattern obtained for the same image using the normalized correlation method in FIG. 24 (A). The correlation pattern illustrated in FIG. 24 (B) can be seen to exhibit a more distinct peak when compared to the correlation pattern illustrated in FIG. 24 (B).

Because of this, in the phase-only correlation method, if the noise pattern that is shared by both the stored image and the collation image is included, then sometimes the autocorrelation pattern of the fixed pattern noise with itself will be stronger than the correlation between the stored image and the collation image.

Figure 25:
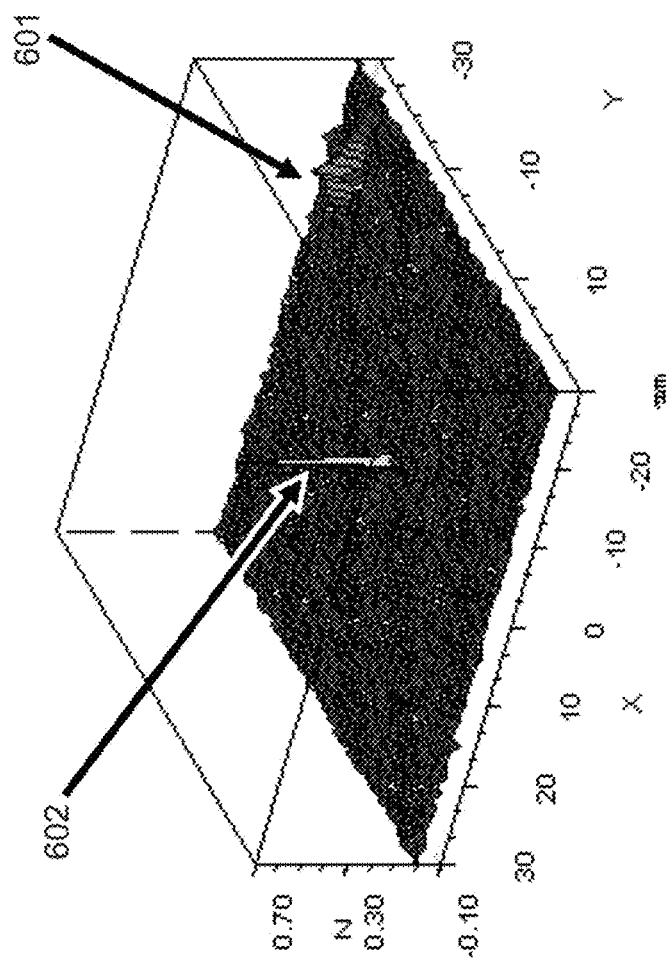
FIG. 25 is a diagram illustrating one example of a correlation method obtained through the phase-only correlation method when the common noise is included in the stored image and the collation image.

For example, FIG. 25 illustrates one example of a phase-only correlation for a case wherein identical fixed pattern noise is included in both the stored image and the collation image. In FIG. 25, the correlation arising from the fixed pattern noise at the position indicated by the arrow 602 is greater than the correlation of the image pattern to be collated at the position indicated by the arrow 601. In such a case, there will be an incorrect detection of the self-correlated pattern of the fixed pattern noise as the correlation pattern between the stored image and the collation image, with the risk that this will make it difficult to perform the desired image collation and position detection. In recent years the resolution of image capturing elements has increased and the area of each individual pixel has gotten smaller, and thus the effect of the fixed pattern noise tends to be more pronounced than it has in the past.

It can be beneficial if it were possible to eliminate or reduce the fixed pattern noise from the captured images, it is not easy to eliminate or reduce the fixed pattern noise directly from an image captured by the image capturing device 1. There are also often cases wherein various parameters, such as the intensity and direction of external lighting, are not the same at the time of image collation as they were at the time of image storing. Because of this, it is not possible to eliminate or reduce the fixed pattern noise through simple subtraction, requiring an adaptive noise elimination or reduction process, or the like, that is suited to the captured image at the time of each collation.

On the other hand, in the method set forth in the aforementioned JP '511 wherein the anti-noise characteristics were improved through an improvement upon the phase-only correlation method, the effect of noise was reduced through the use of frequency weighting based on spatial frequency information for the stored image. However, in this method there is no thought given to the effect of the fixed pattern noise, or, specifically, to the relative magnitude relationships between the stored image patterns and the fixed pattern noise (the quality), and thus in the collation between the stored image and the collation image there is the possibility that erroneous detection will occur, and it cannot be said that there has been an adequate effect in reducing the fixed pattern noise.

That which is important in eliminating or reducing noise is the relative magnitude relationship between the stored image and the noise (for example, the signal-to-noise ratio). Even if the amplitude (power) of a frequency component of a stored image were low for a given frequency, if the noise at that frequency were even less, then the signal-to-noise ratio for the two would be good (high), and that frequency component would be useful in correlation calculations. On the other hand, even if the amplitude for the frequency component in the stored image were high, if the amplitude of the noise were even greater than that, then the signal-to-noise ratio of the two would be poor (low), and thus it would be preferable to not use that frequency in the correlation calculations. In JP '511 the frequency weightings were determined using only the stored image, but there is room for improvement in the point that the signal-to-noise ratio was not taken into consideration.

Given this, the inventors in the present application devised a method for adjusting the frequency weighting when producing a correlation pattern between a stored image and a collation image (an example of a third image) based on estimated results, by estimating the frequency components directly for a stored image that does not include fixed pattern noise and estimated frequency components of the fixed pattern noise, based on an image that includes a specific image pattern (a pattern to be detected) and the fixed pattern noise (a stored image as an example of the first image), and an image that includes the fixed pattern noise but does not include the image pattern of the stored image (a blank image, as an example of the second image). That is, it is possible to perform image collation and position offset detection with a reduction in the impact of the fixed pattern noise, through performing the frequency weighting based on frequency components of both the stored image and the fixed pattern noise. Note that all that is necessary is to be able to determine the frequency weightings, and thus the estimated results for the frequency components need not perfectly agree with the actual frequency components.

Here the frequency components of the fixed pattern noise can be estimated through capturing a blank image using the image capturing device 1. On the other hand, the frequency components of the stored image itself, which does not include the fixed pattern noise, are difficult to obtain directly insofar as the stored image is captured using the image capturing device 1; however, the estimation is possible from the frequency components of the stored image that includes the fixed pattern noise and the frequency components of the blank image.

Consequently, if the estimation is performed through capturing the blank image and the stored image using the image capturing device 1 and then performing the frequency component analysis of the respective image data, then it becomes possible to determine the frequency weightings taking the frequency components of both the stored image and the fixed pattern noise into account. The use, at the time of the collation process, of these frequency weightings that have been determined, in order to calculate the correlations between the stored image and the collation image makes it possible to obtain correlations wherein the effect of the fixed pattern noise has been reduced. The image collation and position detection should be performed using the correlations. Note that the image data wherein the "stored image," "blank image," and "collation image" have each been captured using the image capturing device 1 are each examples respectively of the first, second, and third image data.

For example, let us define the fixed pattern noise of the image capturing device 1 as N and the pattern noise of the stored image itself, not including the fixed pattern noise, as G. Defining as F the stored image pattern, including the fixed pattern noise, obtained through the image capturing device 1, then it can be assumed that F=G+N. That is, the result of adding the fixed pattern noise N to the pattern of G of the stored image that does not include the fixed pattern noise is the stored image pattern F captured by the image capturing device 1.

Here the frequency components of the fixed pattern noise N are also included in the image pattern of the stored image, and can be inferred from the blank image, which does not include the specific image pattern. On the other hand, the frequency components of the stored image itself (Pattern G) that does not include the fixed pattern noise N can be estimated from the Pattern F, which includes the fixed pattern noise, and the fixed pattern noise N. The power spectral densities of F, G, and N shall be indicated, respectively, as the $\Phi_F$, $\Phi_G$, and $\Phi_N$, where the cross-spectral densities of Pattern G and Pattern N shall be referred to as $\Phi_{G,N}$ and $\Phi_{N,G}$. In such a case, the following Equation (1.1) is satisfied:

Equation 1.1

$$\Phi_F = \Phi_G + \Phi_{G,N} + \Phi_{N,G} + \Phi_N \quad (1.1)$$

G is the stored image pattern, and N is an irregular noise pattern, and thus normally the correlation between the two is small. Consequently, when compared to the spectral densities $\Phi_G$ and $\Phi_N$, the cross-spectral densities $\Phi_{G,N}$ and $\Phi_{N,G}$ will be negligible. Consequently, Equation (1.1) can be approximated to obtain Equation (1.2):

Equation 1.2

$$\Phi_G = \Phi_F - \Phi_N \quad (1.2)$$

Consequently, the frequency components of the stored image itself (Pattern G) that does not include the fixed pattern noise N can be estimated from the stored image (Pattern F) that includes the fixed pattern noise and the blank image (Pattern N). That is, it is possible to estimate the frequency components of the stored image itself (pattern G) by subtracting the power spectral densities of the fixed pattern noise N from the power spectral densities of the stored image pattern F that includes the fixed pattern noise, which were captured by the image capturing device 1.

If it is possible to estimate the frequency components of the stored image itself (Pattern G) that does not include the fixed pattern noise N and to estimate the frequency components of the fixed pattern noise N, then it is possible to estimate, from those estimated values, the signal-to-noise ratio of the stored image (Pattern G) and the fixed pattern noise N. Setting the frequency weightings so that the weightings will be small for those frequencies wherein the signal-to-noise ratio is relatively low and then calculating the frequency-weighted correlation between the stored image and the collation image makes it possible to obtain a correlation wherein the effect of the fixed pattern noise has been reduced. This results in the ability to increase the accuracy of image collation and location detection by reducing the frequency with which incorrect detection occurs resulting from the fixed pattern noise.

In the image collating process, the frequency-weighted correlation using the frequency weightings established in the storing process may be used each time correlations are calculated between a stored image and a collation image. Consequently, all that needs to be done is to add, to the existing correlation method, one process for multiplying the frequency weightings, making it possible to avoid the collating process becoming large and complex. Furthermore, once is enough for the determination of the frequency weightings, and there need not be adjustments each time a collation is performed. For example, while in a method for performing noise elimination for a collation image it is necessary to have a process that is applicable depending on the collation image for each collation, the present form of embodiment makes it possible to obtain the effect of suppressing erroneous detection resulting from the fixed pattern noise even when such a process is not performed.

Functional Structure of the Image Processing Device 2

Figure 2:
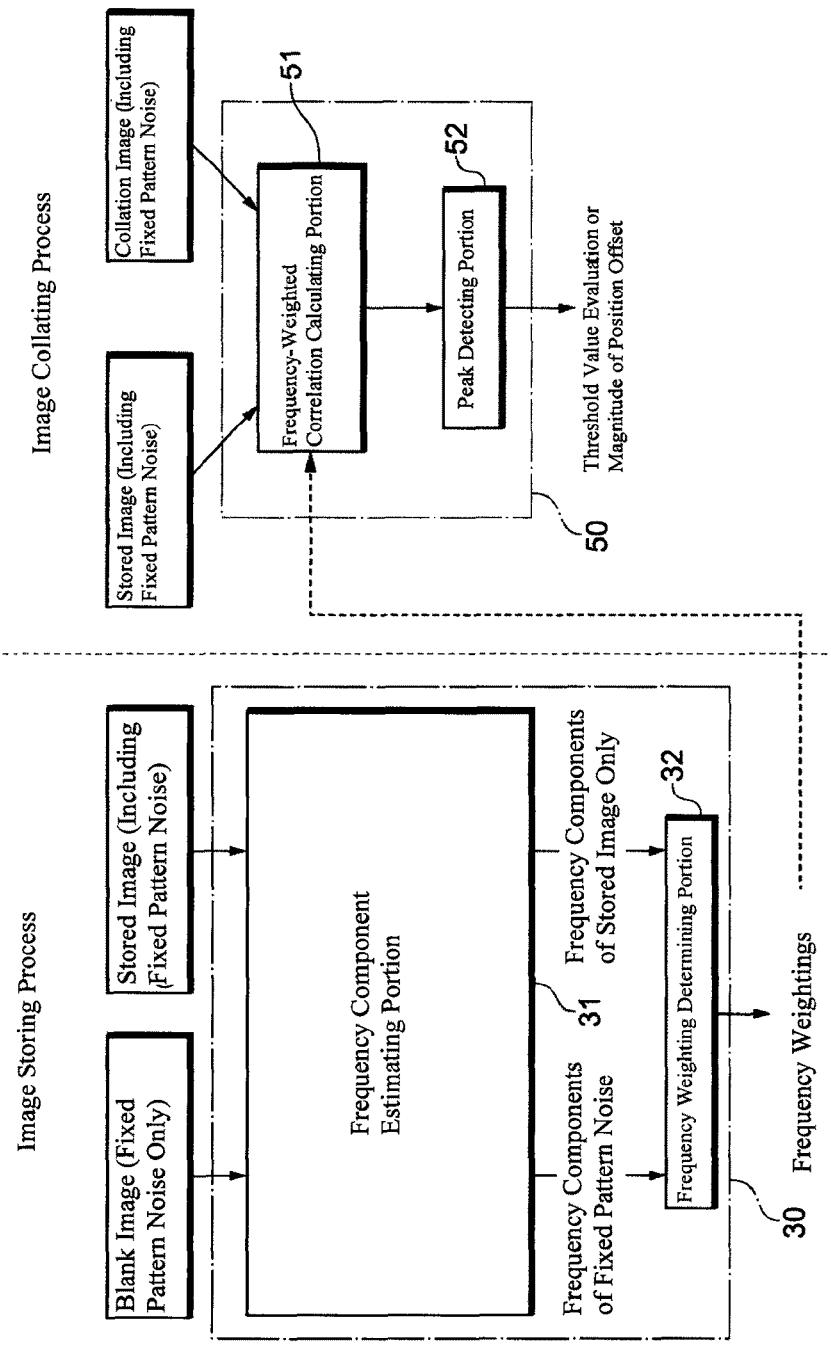
FIG. 2 is a block diagram illustrating an example of a functional structure of the image processing device (an image storing/collating device) illustrated in FIG. 1.

Focusing on the functional structure of the image processing device 2 according to the present example, by which to achieve the method as set forth above, if, as illustrated in FIG. 2, for example, the function is as an image storing device (image storing processing portion) 30, then the CPU 21 exhibits functions as the frequency component estimating portion 31 and the frequency weighting determining portion 32, through acting in accordance with an image storing program, and if functioning as an image collating device (image collating processing portion) 50, the CPU 21 exhibits the functions of the frequency-weighted correlation calculating portion 51 and the peak detecting portion 52, through acting in accordance with an image collating program.

The Image Storing Function

In the image storing device 30, the frequency component estimating portion 31 analyzes and estimates the frequency components of the stored image itself (Pattern G) that does not include the fixed pattern noise N, and the frequency components of the fixed pattern noise N, based on image data (blank image data) that is obtained through capturing a blank image using the image capturing device 1, to include the fixed pattern noise N but not include the specific image pattern (including the pattern G of the stored image), and based on image data (stored image data) that includes the fixed pattern noise N, obtained by capturing, using the same image capturing device 1, an image (the stored image) that can be referenced as a template at the time of the collation process.

Note that the purpose for capturing the blank image is to estimate the relative magnitude relationships between the fixed pattern noise, the stored image, and the collation image, and thus when capturing the blank image, preferably it is done so as to produce the fixed pattern noise that is included when capturing the stored image and the collation image. Consequently, the image capturing conditions for the blank image are preferably identical to the conditions when capturing the stored image and when capturing the collation image. For example, if the image capturing device for capturing the blank image and the image capturing device for capturing the stored image and the collation image are extremely different from each other in terms of sensitivity (gain), then it would be extremely likely that there would be an effect on the aforementioned relative magnitude relationships, and thus this should be avoided. Moreover, if the values of the blank image data that are captured are saturated at the maximum values, then it is likely that it would not be possible to obtain the fixed pattern noise correctly, so this too should be avoided.

The analysis and estimation of these frequency components may be performed, for example, using Fourier transform processes, such as discrete Fourier transforms (DFT) or fast Fourier transforms (FFT), or the like, or through band-limited (filtering) processes such as wavelet transforms, or the like. Additionally, the estimation of the frequency components of the stored image data (Pattern G) that does not include the fixed pattern noise N may be performed through subtracting the analysis results for the frequency components of the blank image data from the analysis results of the frequency components of the stored image data (Method 1) or through performing analysis of the frequency components for the result of subtraction of the blank image data from the stored image data (Method 2). However, the estimation accuracy can be said to be higher for Method 1 than for Method 2.

Figure 3:
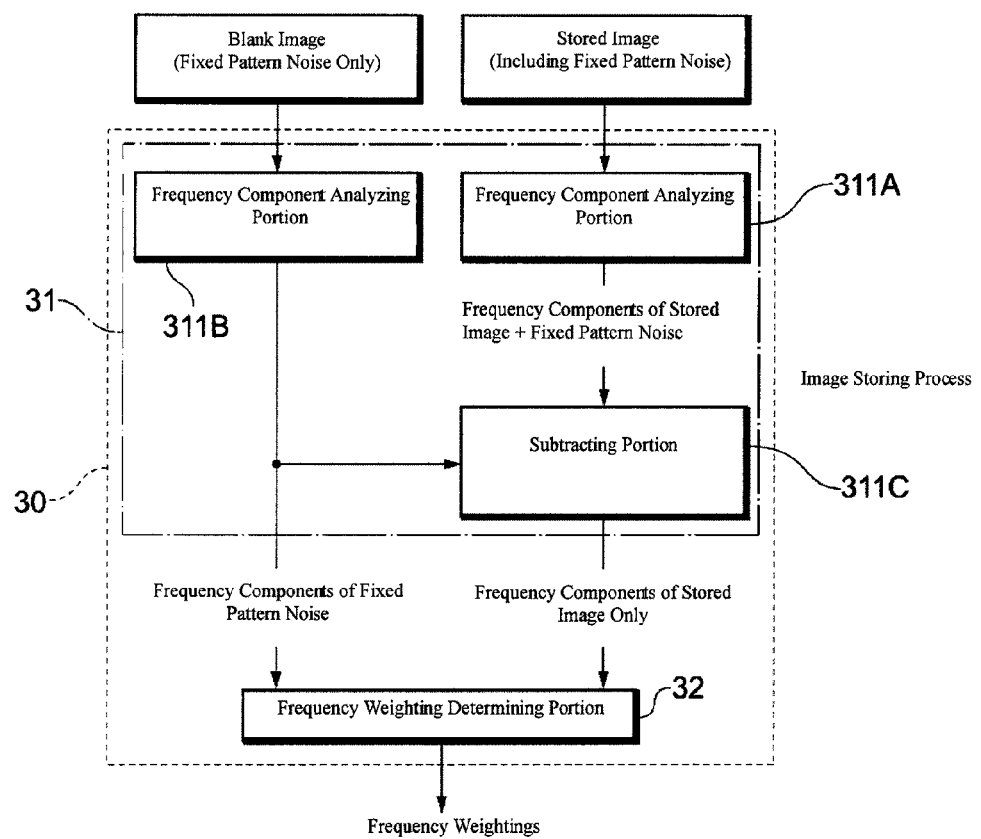
FIG. 3 is a block diagram illustrating an example of a functional structure of the image storing device illustrated in FIG. 2.
Figure 4:
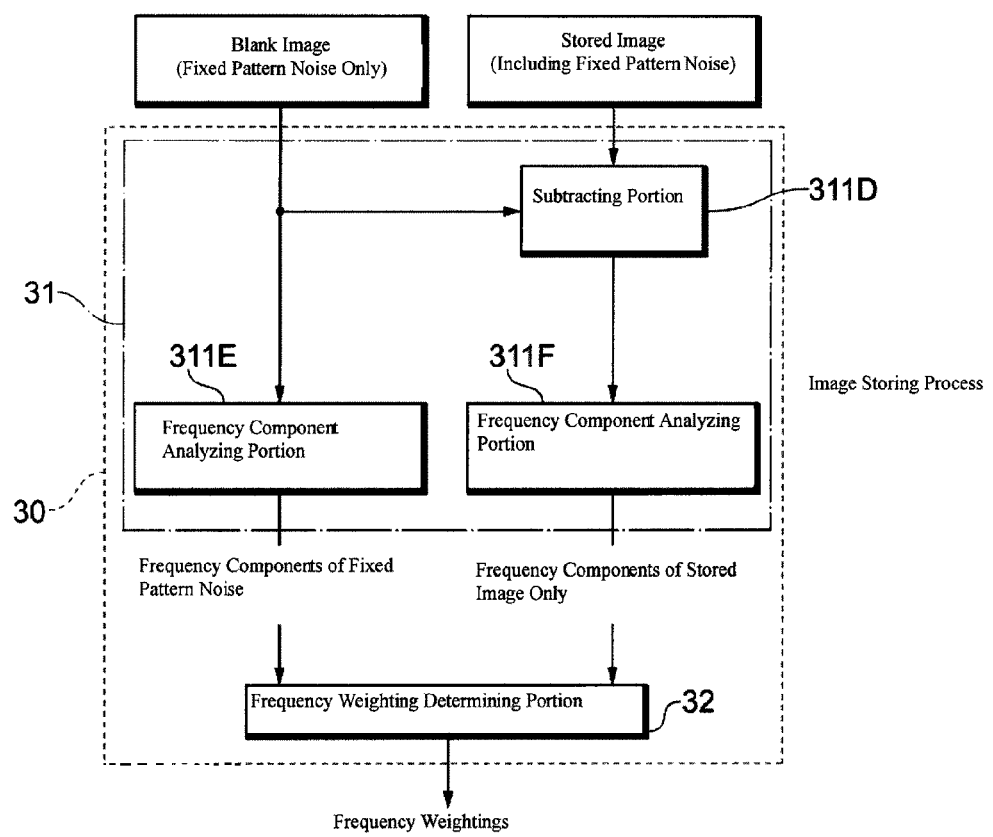
FIG. 4 is a block diagram illustrating another example of a functional structure for the image storing device illustrated in FIG. 2.

FIG. 3 illustrates the structure of a frequency component estimating portion 31 for the case of Method 1, and FIG. 4 illustrates an example of a structure for the frequency component estimating portion for the case of Method 2. In the frequency component estimating portion 31 illustrated in FIG. 3, frequency component analyses are performed by the (first and second) frequency component analyzing portions 311A and 311B for the stored image data and the blank image data, where the respective analysis results are subtracted by a subtracting portion 311C. As a result, the estimated values for the frequency components of the fixed pattern noise are obtained through the frequency component analyzing portion 311B, and the estimated values for the frequency components of the stored image itself, which does not include the fixed pattern noise, are obtained from the subtracting portion 311C.

On the other hand, in the frequency component estimating portion 31 illustrated in FIG. 4, the blank image data (prior to the frequency component analysis) is subtracted from the stored image data by the subtracting portion 311D, and the frequency components are analyzed by the frequency component analyzing portion 311F for the subtraction results. Doing so makes it possible to obtain, from the frequency component analyzing portion 311F, estimated values for the frequency components of only the stored image, not including the fixed pattern noise. The estimated values for the frequency components of the blank image data are obtained from the frequency component analyzing portion 311E.

Following this, the frequency weighting determining portion 32, illustrated in FIG. 2 through FIG. 4, as one example of a controlling portion for controlling the frequency weightings used in the collation process, determines the weightings relating to the frequency components (hereinafter termed the "frequency weightings") so as to make the frequency weightings small for the frequencies for which the signal-to-noise ratio is relatively low, by estimating the signal-to-noise ratios for the stored image data that does not include the fixed pattern noise and the fixed pattern noise, based on the estimated values for the frequency components of the blank image data and the estimated values of the frequency components of the image data (Pattern G) of the stored image itself that does not include the fixed pattern noise N, obtained from the frequency component estimating portion 31, as described above. The frequency weightings that are determined may be stored in a storing portion (such as the RAM 23 or the HD 24) by the CPU 21, and may be sent to an external device (such as the image collating device 50) through the interface 26. (This is also true in the explanations below.)

On the other hand, in the image collating device 50 that is illustrated in FIG. 2, the frequency-weighted correlation calculating portion 51 uses the frequency weightings, determined by the frequency weighting determining portion 32, to calculate frequency-weighted correlations between the stored image and the collation image.

The peak detecting portion 52 detects the peak of the correlations obtained by the frequency-weighted correlation calculating portion (hereinafter termed simply the "correlation calculating portion") 51. If this is an image collation, then the detected peak value is evaluated as to whether or not it surpasses a specific threshold value. If this is a position offset detection, then the position of the detected peak corresponds to the offset between images, and thus an estimated value for the positional offset can be obtained from the detection results.

Note that, as described above, the image processing device 2 may be provided with both functions as an image storing processing portion 30 and as an image collating processing portion 50, or may be provided with one or the other. In the latter case, the frequency weightings determined by the image storing processing portion 30 may be provided to the image collating processing portion 50. The state of this provision may be through transmission through communications, or may be provided on a storage medium whereon the frequency weightings are stored.

More specific examples (and variations) of the image storing processing portion 30 (frequency component estimating portion 31) and the image collating processing portion 50 (frequency-weighted correlation calculating portion 51) are explained below. Note that in the below the explanations are for a state that is based on a frequency-weighted phase-only correlation, as a Specific Example 1 (in FIG. 5 through FIG. 12), a state that is based on a wavelet transform as a Specific Example 2 (in FIG. 13 through FIG. 20), and on a state that is a combination of Specific Example 1 and Specific Example 2, as Specific Example 3 (in FIG. 21 through 23).

Specific Example 1

Figure 5:
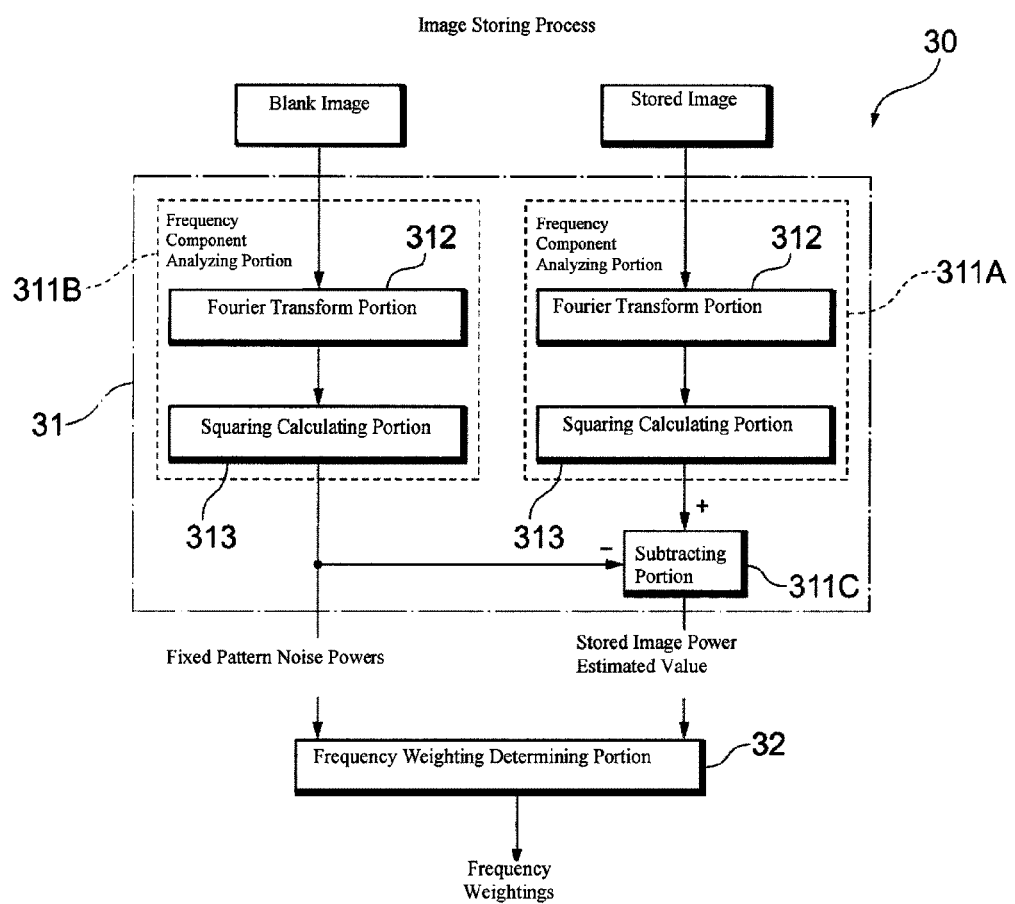
FIG. 5 is a block diagram illustrating a Specific Example 1 of the image storing device illustrated in FIG. 3.

FIG. 5 is a block diagram illustrating a Specific Example 1 of an image storing processing portion 30 (frequency component estimating portion 31). The image storing processing portion 30 that is illustrated in FIG. 5 corresponds to the structure illustrated in FIG. 3, and comprises a frequency component analyzing portion 311A and 311B that handle, respectively, the stored image data and the blank image data, and the respective Fourier transform portions 312 and squaring calculating portions 313.

One of the Fourier transform portions 312 applies a Fourier transform process such as DFT or FFT to the blank image data to produce Fourier transform pattern data for the blank image data, and the other applies a Fourier transform process such as DFT or FFT to the stored image data to produce Fourier transform pattern data for the stored image data. Note that there is a plurality of elements in each of these Fourier transform pattern data that are obtained.

One of the squaring calculating portions 313 calculates squares of the absolute values of the Fourier transform results (Fourier transform pattern data) of the blank pattern data, and the other calculates squares of the absolute values of the Fourier transform results (Fourier transform pattern data) of the stored image data. The calculation of the squares of the absolute values of the Fourier transform data corresponds to calculating the power of each individual frequency component of the image data. Doing so produces the respective frequency component power patterns of the stored image and the blank image, making it possible to know the degree of power there is for each of the individual frequencies.

Figure 7:
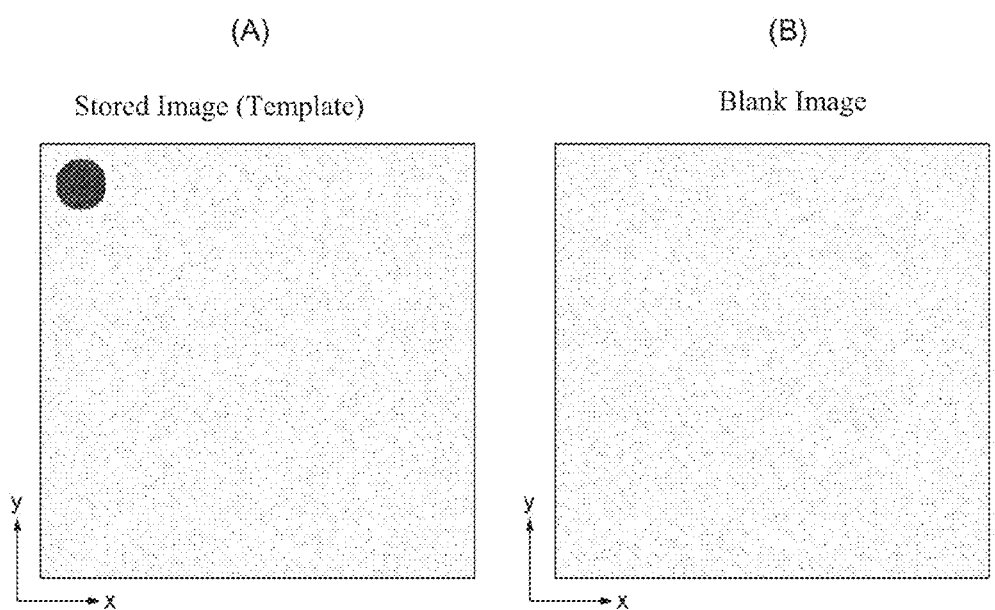
FIG. 7 is a diagram illustrating one example of an image used in the image storing device illustrated in FIG. 5, wherein (A) is a diagram illustrating a stored image and (B) is a diagram illustrating one example of a blank image.
Figure 8:
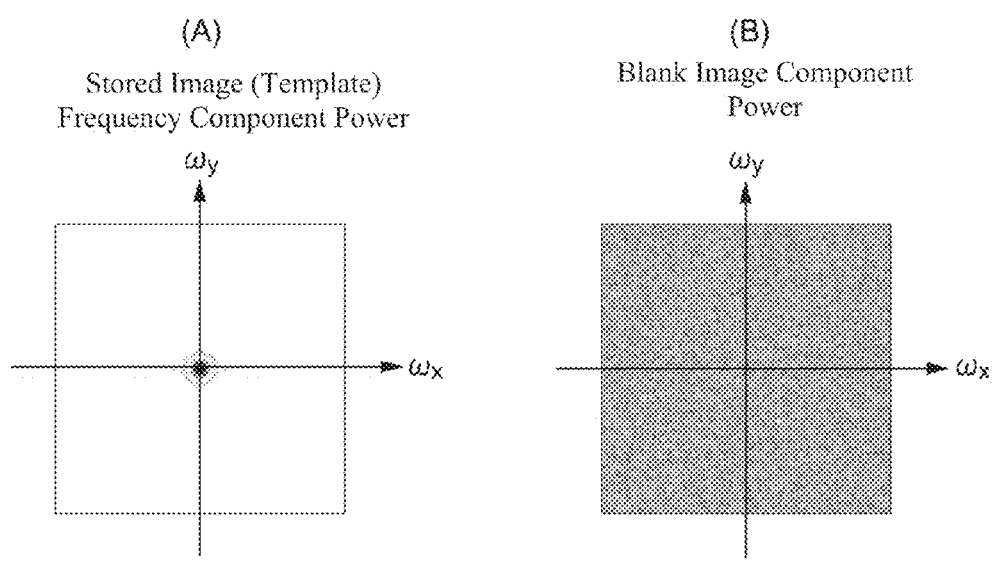
FIG. 8 (A) is a diagram illustrating schematically an example of a frequency component power distribution for the stored image illustrated in FIG. 7 (A), and FIG. 8 (B) is a diagram illustrating schematically an example of a frequency component power distribution for the blank image illustrated in FIG. 7 (B).

For example, for a stored image that includes a specific image pattern such as illustrated in FIG. 7 (A), there will be many low-frequency components, as illustrated in FIG. 8 (A), and relatively few high-frequency components. In contrast, the blank image, which comprises the fixed pattern noise and which does not include the specific image pattern, as illustrated in FIG. 7 (B), usually has the same power regardless of the frequency, as illustrated in FIG. 8 (B). However, because the maximum value is very different between the two (approximately 80 times), it is not possible to simply compare the shading of the colors as illustrated in FIG. 8 (A) and FIG. 8 (B). Note that in FIG. 8 (A) and FIG. 8 (B), the horizontal axes indicate the frequencies in the horizontal direction and the vertical axes indicate the frequencies in the vertical direction, and the frequencies are at their lowest points at the origin at the point wherein the axes cross. That is, the frequency at the origin is the lowest, and the greater the distance from the origin the higher the absolute value of the frequency. (See, for example, FIG. 10.)

The subtracting portion 311C illustrated in FIG. 5 subtracts the frequency component powers of the blank image from the pattern of the frequency component powers of the stored image data. Because the stored image and the blank image were captured using the same image capturing device 1, there is a high probability that the powers of the fixed pattern noise included therein are identical, and thus the frequency component powers of the stored image itself, wherein the powers caused by the fixed pattern noise have been subtracted (are not included) are produced as a pattern (estimated values).

The frequency weighting determining portion 32 determines the weightings of the individual frequencies (frequency weightings) based on the pattern of frequency component powers of the stored image (not including the fixed pattern noise) and based on the pattern of frequency component powers of the blank image, obtained through the processes, described above. The frequency weightings, as illustrated, can be determined (produced) as a weighting function pattern based on ratios of the two.

First ratios are calculated between the pattern of frequency component powers of the stored image, which does not include the fixed pattern noise, and the pattern of the frequency component patterns of the blank image, using the following Equation (1.3):

Equation 1.3

$$R(\omega_x, \omega_y) = \frac{\|F(\omega_x, \omega_y)\|^2 - \|N(\omega_x, \omega_y)\|^2}{\|N(\omega_x, \omega_y)\|^2} \quad (1.3)$$

Here $\omega_x$ indicates the frequencies in the horizontal direction and $\omega_y$ indicates the frequencies in the vertical direction. Additionally, $F(\omega_x, \omega_y)$ indicates a Fourier transform of the stored image (including the fixed pattern noise), and $N(\omega_x, \omega_y)$ indicates a Fourier transform of the blank image. That is, the denominators indicate the frequency component powers of the blank image and the numerators indicate the frequency component powers (estimated values) of the stored image, not including the fixed pattern noise, calculated through the subtraction described above. In other words, $R(\omega_x, \omega_y)$ indicates the ratio between the two (the signal-to-noise ratio).

Temporary weightings the $W_{tmp}(\omega_x, \omega_y)$ are determined through, for example, the following Equation (1.4) from $R(\omega_x, \omega_y)$:

Equation 1.4

$$W_{tmp}(\omega_x, \omega_y) = \frac{1}{1 + \exp(-5(R(\omega_x, \omega_y) - 3))} \quad (1.4)$$

Figure 9:
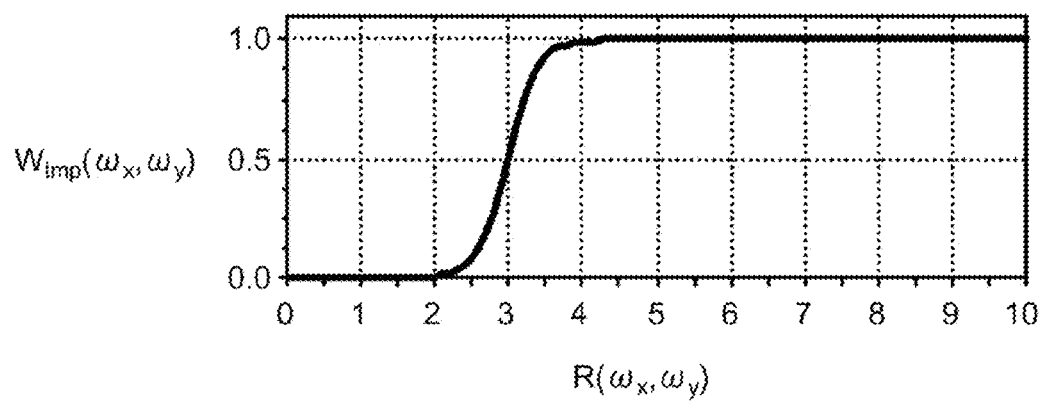
FIG. 9 is a diagram illustrating one example of a sigmoid function used in the frequency weighting determining portion illustrated in FIG. 5

Here the relationship between $R(\omega_x, \omega_y)$ and $W_{tmp}(\omega_x, \omega_y)$ can be provided through a sigmoid function, as illustrated in FIG. 9 as one non-limiting example. In other words, if, at a given frequency, the frequency component power of the stored image is at least four times that of the frequency component power of the fixed pattern noise (the signal-to-noise ratio is at least four), then the maximum frequency weighting (approximately 1.0) is applied, and if less than two times, the minimum (approximately 0) frequency weighting is applied. In the range of signal-to-noise ratios between 2× and 4×, frequency weighting that vary continuously (smoothly) depending on the change in the signal-to-noise ratio are provided through a sigmoid function, where a frequency weighting that is between the maximum and the minimum is applied when the signal-to-noise ratio is 3.

Note that while in this example the relationship between $R(\omega_x, \omega_y)$ and $Wtmp(\omega_x, \omega_y)$ was set as a continuous function, a discontinuous function may be used instead. For example, a rule may be applied wherein the weighting is 0 if the signal-to-noise ratio is less than 3, and equal weightings are applied otherwise. It is possible to vary, as appropriate, the weighting function pattern to be applied, under a rule wherein the weightings for the frequencies wherein the signal-to-noise ratio is low and the influence of the fixed pattern noise is high are made small.

Additionally, normalization may be performed so that the sum of the weightings of the entire pattern will be 1, through, for example, the equation below (1.5) in the weighting function pattern:

Equation 1.5

$$W(\omega_x, \omega_y) = \frac{W_{tmp}(\omega_x, \omega_y)}{\sum_{\omega_x, \omega_y} W_{tmp}(\omega_x, \omega_y)} \quad (1.5)$$

This normalization can keep the correlation pattern (the absolute values of the correlation values) that is calculated in the collation process, described below, in the range of 0 through 1, producing the benefit of simplifying the evaluation of the strength of the correlation in the collation process. However, this normalization is not an indispensable process.

Figure 10:
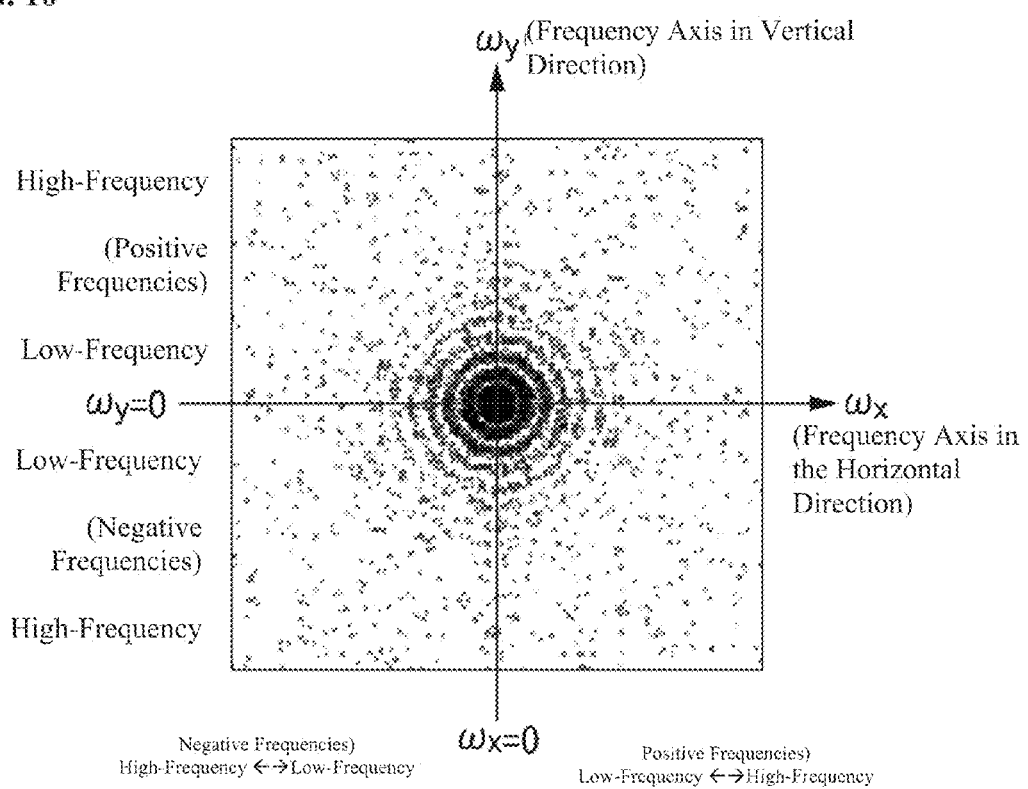
FIG. 10 is a diagram illustrating schematically one example of frequency weighting determined by the frequency weighting determining portion illustrated in FIG. 5.

FIG. 10 illustrates an example of the frequency weightings obtained. As illustrated in FIG. 10, the weightings are high for the low-frequency components (the center portion) and the weightings are low for the high-frequency components (the edge portions). The frequency weightings (weighting function) obtained in this way are used in the collation process.

Image Collating Function

Figure 11:
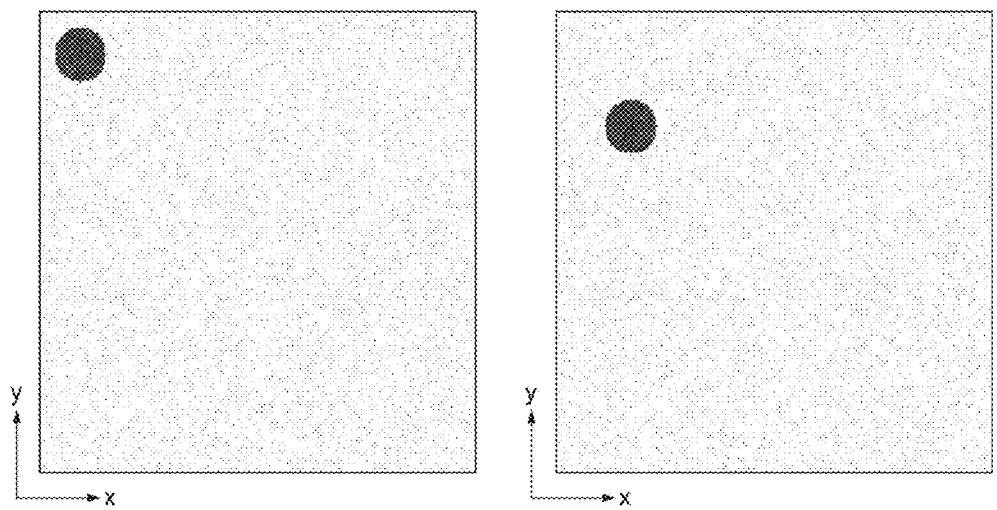
FIG. 11 is a diagram illustrating one example of an image used in the image collating device illustrated in FIG. 6, wherein (A) is a diagram illustrating one example of a stored image and (B) is a diagram illustrating one example of a collation image.

The image collating function will be explained next. The image collating device 50 obtains the stored image data and the image data (the collation image data obtained by capturing, using the image capturing device 1 that captured the stored image, the image to be collated. As a non-limiting example, let us assume that the collation image (reference) is an image (as illustrated in FIG. 11 (B)) wherein the pattern of the stored image, illustrated in FIG. 11 (A) has been shifted by 20 pixels in the horizontal (x axis) direction and by 40 pixels in the vertical (y axis) direction. In other words, there is a position offset of 20 pixels in the horizontal direction and 40 pixels in the vertical direction between the two images illustrated in FIG. 11 (A) and FIG. 11 (B). The ultimate goal for the collation process is to calculate a frequency-weighted phase-only correlation between these images.

Figure 6:
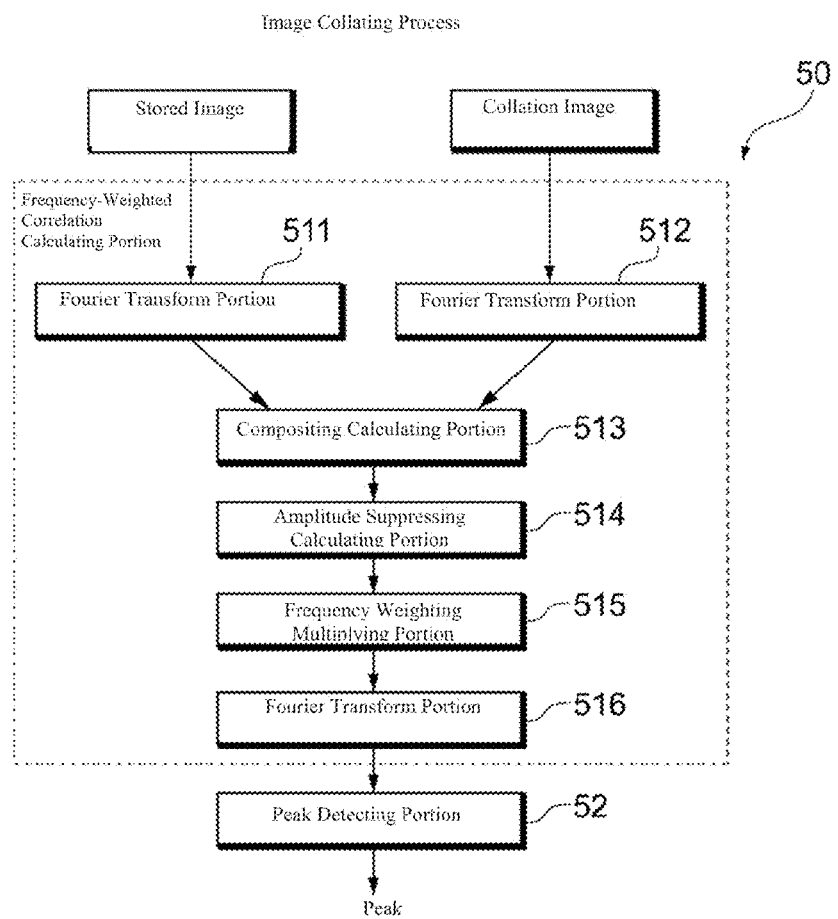
FIG. 6 is a block diagram illustrating a Specific Example 2 of the image storing device illustrated in FIG. 3.

In the image collating device 50, the frequency-weighted correlation calculating portion 51, as illustrated in FIG. 6, comprises, for example, Fourier transform portions 511 and 512 for handling, respectively, the stored image (data) and the collation image (data), a compositing calculating portion 513, an amplitude suppressing calculating portion 514, a frequency weighting multiplying portion 515, and a (inverse) Fourier transform portion 516.

One of the Fourier transform portions 511 applies a Fourier transform process, such as DFT or FFT, to the stored image data read out from a storing portion (such as the HD 24), to produce Fourier transform pattern data of the stored image data.

The other Fourier transform portion 512 applies a Fourier transform process such as DFT or FFT to image data (collation image data) obtained through capturing, using the image capturing device 1, the image to be compared, to produce Fourier transform pattern data for the collation image data.

The compositing calculating portion 513, as illustrated, for example, in the equation below (1.6), multiplies the Fourier transform pattern data of the stored image, obtained from the Fourier transform process, by the complex conjugates of the Fourier transform pattern data of the collation image, to composite the two sets of Fourier transform pattern data to produce a composited Fourier transform pattern data.

Equation 1.6

$$P(\omega_x,\omega_y)=F(\omega_x,\omega_y)H^*(\omega_x,\omega_y) \quad (1.6)$$

Note that $F(\omega_x, \omega_y)$ indicates the Fourier transform of the stored image, $H(\omega_x, \omega_y)$ indicates the Fourier transform of the collation image, and H* indicates the complex conjugates of H. Note that the operation to obtain the complex conjugates of the pattern wherein the Fourier transform has been performed on the stored image may be performed prior to compositing, but in that case the correlation pattern data that is ultimately obtained will be reversed both vertically and horizontally, which must be kept in mind in position offset detection.

The amplitude suppressing calculating portion 514 suppresses to 1, through an amplitude suppressing calculation, the amplitude components of the composited Fourier transform pattern data obtained from the compositing calculating portion 513. This calculation makes it possible to extract the phase components of the composited Fourier transform pattern data. As illustrated in, for example, the equation below (1.7), phase components can be calculated through suppressing, to 1, the amplitudes by dividing the composited Fourier transform pattern data by the absolute values thereof Equation 1.7

$$Q(\omega_x, \omega_y) = \frac{P(\omega_x, \omega_y)}{|P(\omega_x, \omega_y)|} \quad (1.7)$$

The frequency weighting multiplying portion 515 multiplies the frequency weightings (the frequency function pattern) $W(\omega_x, \omega_y)$, determined by the frequency weighting determining portion 32 at the time of the image storing process, by the pattern data $Q(\omega_x, \omega_y)$ wherein the amplitude components have been suppressed by the amplitude suppressing calculating portion 514.

The Fourier transform portion 516 produces correlation pattern data by performing a Fourier transform on the pattern data after the multiplication of the weighted function pattern $W(\omega_x, \omega_y)$, as described above. In other words, the result of the processes set forth above is the production of a frequency-weighted phase-only correlation function.

Note that these calculations are in order to obtain correlation pattern data from a Fourier transform pattern, and thus this should actually be an inverse Fourier transform; however, when, as a specific example, a Fourier transform (a forward transform) was used in this part, the structure was one wherein the correlation pattern data that was the goal was obtained. This is because the relationship between the inverse Fourier transform and the Fourier transform is, with the exception of different constant portions, no more than a relationship wherein the positive/negative signs of the imaginary parts have been inverted arithmetically, and thus there is no change in accuracy, when viewed quantitatively, when a Fourier transform is applied instead of the inverse Fourier transform. (This is true below as well.) While the Fourier transform portion 516 can replace the actual inverse Fourier transform, in this case it is necessary to be aware that there will be a reversal in both the vertical and horizontal directions of the correlation pattern that is produced, and that the aforementioned effects of normalization will be lost due to differences in the constant portions.

Figure 12:
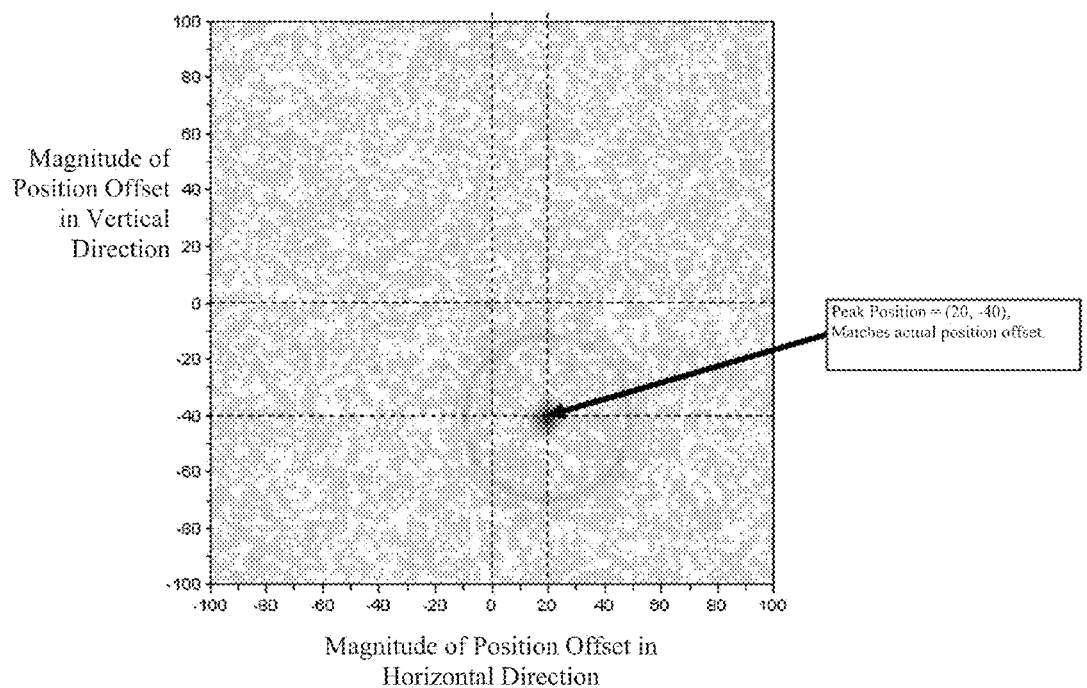
FIG. 12 is a diagram illustrating schematically one example of a correlation pattern obtained by the image collating device illustrated in FIG. 6.

FIG. 12 illustrates an example of the correlation pattern data that is produced. As illustrated in FIG. 12, a strong correlation is obtained in a position corresponding to the position offset. Moreover, the position with the maximum value for the correlation is at 20, −40), which matches the position offset between the stored image and the collation image illustrated in FIG. 11 (A) and FIG. 11 (B).

The peak detecting portion 52 detects a peak of the correlation pattern data that is produced. For the case of image collation, an evaluation is performed as to whether or not the peak value exceeds a specific threshold value. In the case of position offset detection, the peak position is detected and used as the estimated value for the position offset.

Specific Example 2

A form that is based on a wavelet transform (FIG. 13 through FIG. 20) will be explained next as a Specific Example 2 of an image storing processing portion 30 (frequency component estimating portion 31). Note that the stored image, blank image, and collation image each use, as examples, images that are identical to the respective images described above in the Specific Example 1.

Figure 13:
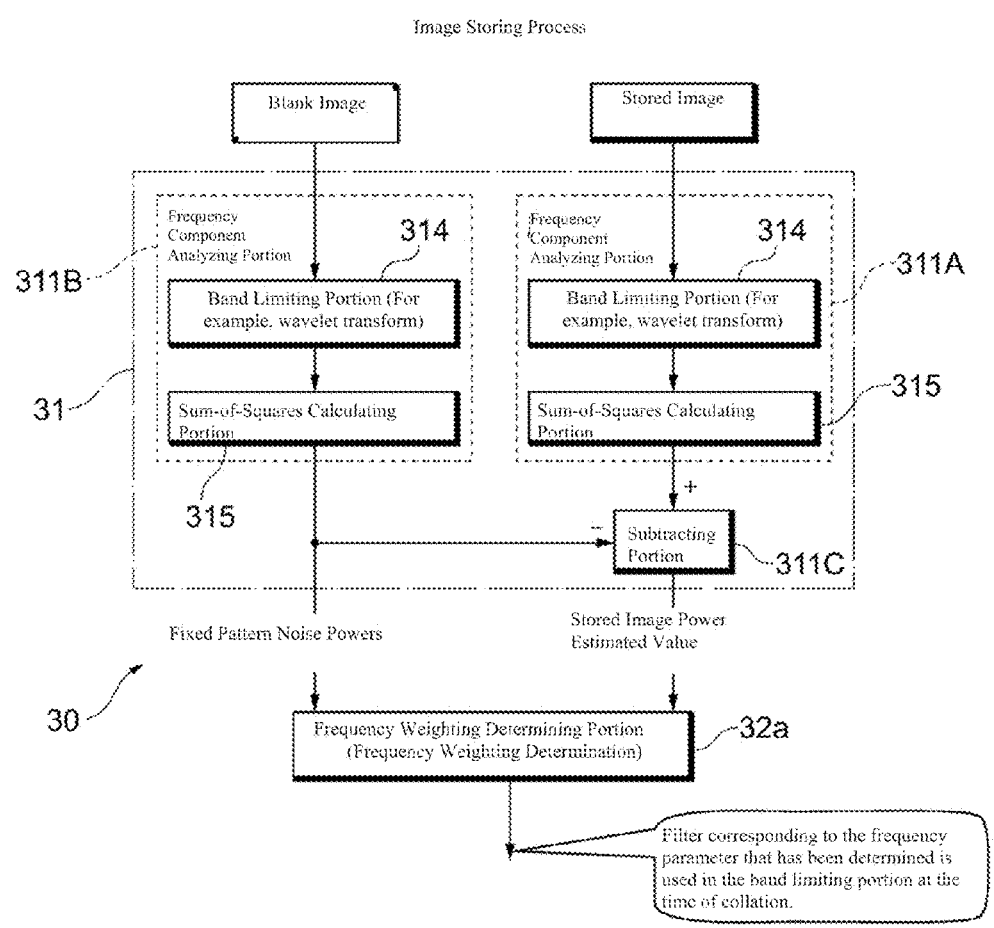
FIG. 13 is a block diagram illustrating a Specific Example 2 of the image storing device illustrated in FIG. 3.

FIG. 13 is a block diagram illustrating a Specific Example 2 of an image storing processing portion 30 (frequency component estimating portion 31). The image storing processing portion 30 that is illustrated in FIG. 13 corresponds to the structure illustrated in FIG. 3, and comprises a frequency component analyzing portion 311A and 311B that handle, respectively, the stored image data and the blank image data, and the band limiting portions 314 and sum-of-square calculating portions 315.

The band limiting portions 314 respectively apply continuous wavelet transforms, as an example of a band limiting process, to the stored image data (including the fixed pattern noise) and the blank image data. As a non-limiting example, the Gabor function illustrated in Equation (2.1), below, can be used in the analyzing wavelet in the continuous wavelet transform.

Equation 2.1

$$\psi(x, y) = \frac{1}{\sqrt{\pi}} \frac{\omega_0}{\gamma} \exp\left(-\frac{\omega_0^2}{2\gamma^2}(x^2 + y^2)\right) \exp(j\omega_0(x + y)) \quad (2.1)$$

Note that $\omega 0 = p$ and $\gamma = \pi$. Here the wavelet transform is performed by the following Equation (2.2) using this Equation (2.1).

Equation 2.2

$$WF(a, b_x, b_y) = \int_{-\infty}^{+\infty} \int_{-\infty}^{+\infty} F(x, y) \frac{1}{a} \psi^*\left(\frac{x - b_x}{a}, \frac{y - b_y}{a}\right) dx dy \quad (2.2)$$

Here $F(x, y)$ indicates the image that is the source of the transform, where $WF(a, b_x, b_y)$ indicates the continuous wavelet transform. Additionally "a" is known as the scale parameter, and corresponds to the inverse of the frequency. bx and by are known as the offset parameters, indicating the position in the image that was used as the center in the transform. An asterisk (*) represents a complex conjugate. Note that there are a variety of other functions that are also known as analyzing wavelets, and those may be used instead.

The continuous wavelet transform (hereinafter termed simply a "wavelet transform") acts as a type of band-pass filter on the target image pattern. The reference (center) frequency for the band-pass filter is determined by the parameter a, which is known as the "scale parameter." In the present example, by way of illustration, the scale parameter is varied between 1 and 20 with increments of 1, such as a=1, 2, ..., 20, and continuous wavelet transforms are performed for each. Note that the scale parameter a corresponds to the inverse of the frequency, so the higher the value, the lower the frequency.

The sum-of-squares calculating portion 315 calculates the sums of squares of each of the image data that have undergone the wavelet transforms in the band limiting portion 314 corresponding thereto.

For example, if the wavelet transforms for the stored image $F(x, y)$ and the blank image $N(x, y)$ are defined, respectively, as $WF(a, b_x, b_y)$ and the $WN(a, b_x, b_y)$, then that which is calculated by the sum-of-squares calculating portion 315 are the sums of squares indicated in the equations below (2.3)

Equation 2.3

$$P_F(a) = \iint |WF(a, b_x, b_y)|^2 db_x db_y$$

$$P_N(a) = \iint |WN(a, b_x, b_y)|^2 db_x db_y \quad (2.3)$$

Here $P_F(a)$ indicates the sum of the powers of the stored image and the powers of the fixed pattern noise, and $P_N(a)$ indicates the power of the fixed pattern noise. Note that while in Equation (2.3), the expressions use integrals, for an image pattern that has undergone A/D conversion, a square of the absolute value of the pixel unit may be calculated instead, and the sums thereof may be calculated.

The wavelet transform may be considered to be a type of a band-pass filter, and thus the performance of a sum-of-squares calculation on the result of the wavelet transform corresponds to calculating the intensity of the powers of the frequency components in the passing band of the band-pass filter (where the band-pass filter has some degree of width in the passing band, so, more precisely, this is the "power around a specific frequency"). These two processes make it possible to understand in general the intensities of the frequency components of the stored image and the blank image. Note that the wavelet transforms (band-pass filters) applied in the individual band limiting portions 314 preferably used identical characteristics; however, they need not be strictly identical. As long as the scale parameter a (the center frequency) is identical, then the passing band widths, and the like, may mutually differ.

The subtracting portion 311C, as indicated by the following Equation (2.4), subtracts the power of the blank image (the sum of squares of the results of the wavelet transforms) from the power of the stored image (the sum of squares of the results of the wavelet transforms). This subtraction is performed between the sums of squares of wavelet transform results having identical scale parameters a.

Equation 2.4

$$P_G(a) = P_F(a) - P_N(a) \quad (2.4)$$

The subtraction described above makes it possible to estimate the powers $P_G(a)$ of the stored image itself, not including the contribution of the fixed pattern noise, for each of the scale parameters a.

The frequency parameter determining portion (frequency weighting determining portion) 32a compares the power $P_G(a)$ of the stored image that does not include the contribution of the fixed pattern noise, and the power $P_N(a)$ of the blank image, for each scale parameter a (varying the scale parameters a).

Figure 15:
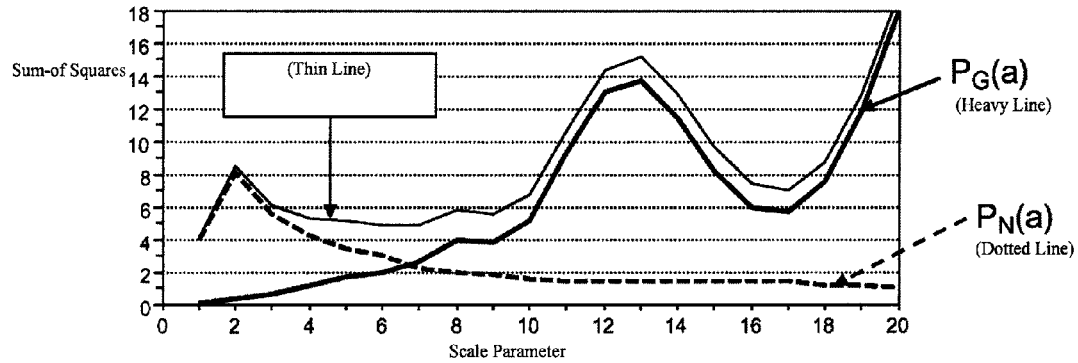
FIG. 15 is an example of graphs illustrating the powers in a stored image, including the contribution of the fixed pattern noise, the powers of the stored image not including the contribution of the fixed pattern noise, and the powers of the blank image, for the scale parameters used in the wavelet transforms illustrated in FIG. 13 and FIG. 14.

FIG. 15 illustrates the case of a graph plotting the power $P_F(a)$ for the stored image, including the contribution of the fixed pattern noise (thin line), the power $P_G(a)$ of the stored image, not including the contribution of the fixed pattern noise (thick line), and the power $P_N(a)$ of the blank image, at each individual scale parameter a. As illustrated in FIG. 15, the power $P_G(a)$ of the stored image tends to have a high power when the value of the scale parameter a is large, or in other words, at low frequencies, where, in contrast, the power $P_N(a)$ of the blank image tends to have a large power when the value of the scale parameter a is low, or in other words, at high frequencies.

Let us consider selecting the scale parameters (the frequency parameters) in the collating process based on these tendencies. In order to suppress the effect of the fixed parameter noise, it is desirable to have the power $P_G(a)$ of the stored image be substantially higher than the power $P_N(a)$ of the blank image, or in other words, desirable to use a scale parameter a wherein the power ratio $P_G(a)/P_N(a)$ between the two is relatively high.

However, in the collating process described below, the continuous wavelet transform is performed using the scale parameter a determined by the frequency parameter determining portion 32a, and a normalized cross-correlation is calculated based on the transform results. In such a case, the selection of a large scale parameter a would mean the calculation of the correlation after applying a band-pass filter with a low center frequency in the collating process, which would discard the fine distinguishing characteristics of the image pattern. This would cause a reduction in the collation performance. Consequently, it is desirable to select the scale parameter a experimentally so as to be as small as possible in a range capable of withstanding the fixed pattern noise.

Figure 16:
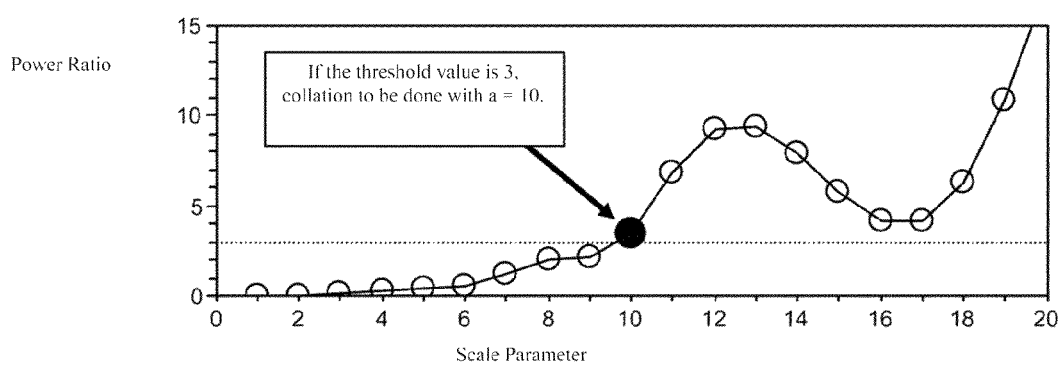
FIG. 16 is a graph illustrating an example of the power ratios of the stored image that does not include the contribution of the fixed pattern noise, and the stored image, for the scale parameters used in the wavelet transforms illustrated in FIG. 13 and FIG. 14.

As a non-limiting example, first a threshold value (for example, 3) is determined for the ratio between the power $P_G(a)$ of the stored image and the power $P_N(a)$ of the blank image. FIG. 16 illustrates an example of a graph wherein the power ratios of the two images are plotted for various scale parameters a. As is illustrated in FIG. 16, when the scale parameter a is incremented by one at a time, beginning at 1, the power ratio exceeds the threshold value of 3 for the first time when the scale parameter a=10. Consequently, the smallest scale parameter a wherein the threshold value is exceeded (the one with the highest frequency) is set to 10 for the scale parameter a to be used in the collation process.

Note that while in the present example the wavelet transforms with a in the range of 1, 2, ..., 20 were all calculated together at the start, doing so is not absolutely necessary, insofar as a scale parameter a that is as small as possible is selected in a range that can withstand the fixed pattern noise. For example, a method may be used wherein the value of the scale parameter a may be very sequentially and the powers may be calculated, skipping the remaining calculations once the threshold value is exceeded.

Image Collating Function

Figure 14:
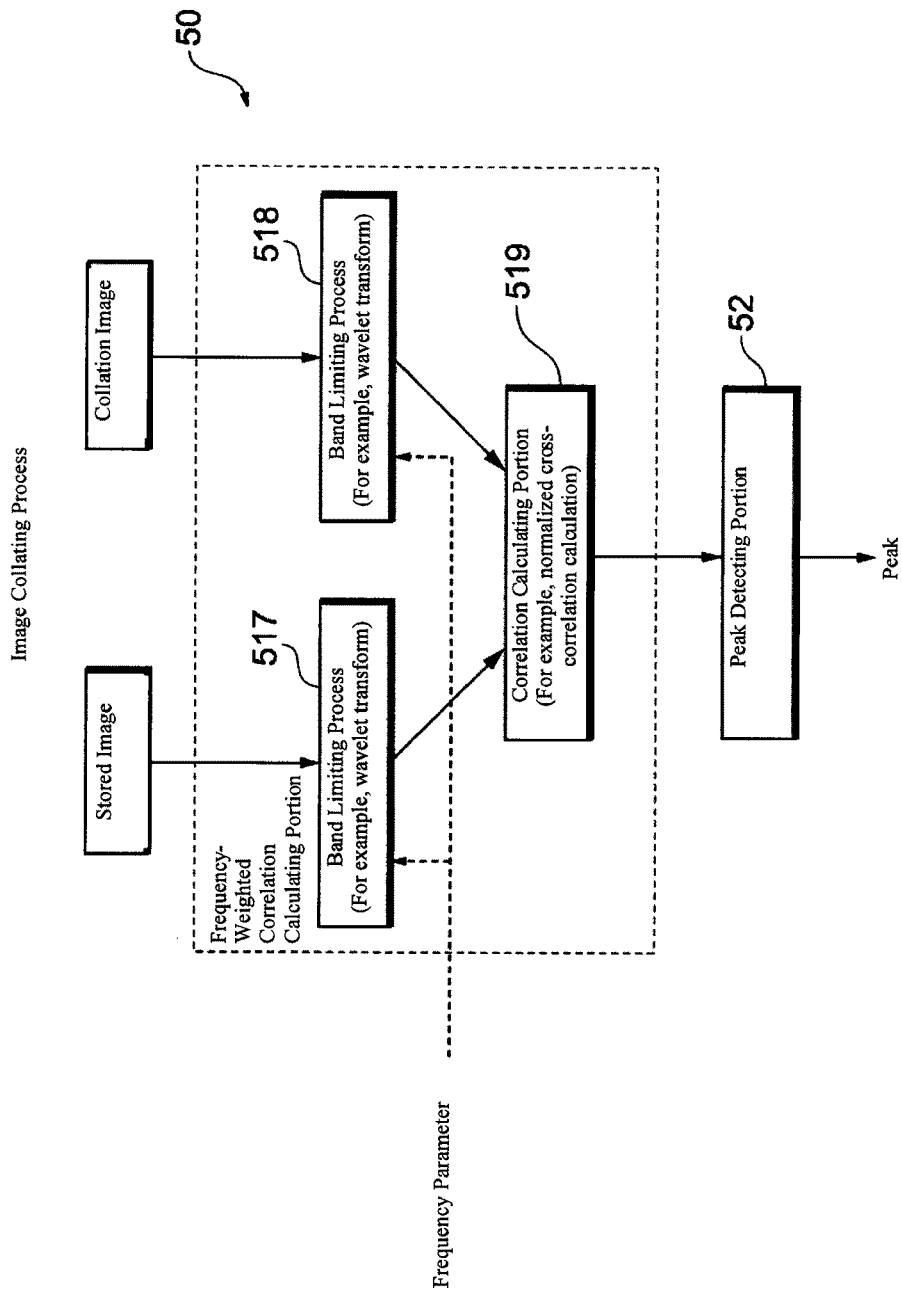
FIG. 14 is a block diagram illustrating a Specific Example 2 of the image collating device illustrated in FIG. 2.

The image collating function in this Specific Example 2 will be explained next. In the image collating device 50, the frequency-weighted correlation calculating portion 51, as illustrated in FIG. 14, is, for example, provided with band limiting portions 517 and 518, corresponding, respectively, to the stored image (data) and the collation image (data), and a correlation calculating portion 519.

The band limiting portions 517 and 518 apply continuous wavelet transforms, as an example of a band limiting process, to the respective stored image data and collation image data. At this time, the value determined by the frequency parameter determining portion 32a is used for the scale parameter a (where there is no need to vary the value of a to determine the value). As with the image storing process, the Garbot function illustrated in Equation (2.1), for example, may be used as the analyzing wavelet.

The correlation calculating portion 519 calculates a normalized cross-correlation pattern (function) between the two image pattern data obtained through the wavelet transforms. This correlation calculation is performed while, for example, offsetting the position of the two images. The wavelet transform is equivalent to the application of a band-pass filter, and thus the combination with the correlation calculation corresponds to calculating a frequency-weighted normalized cross-correlation function.

In other words, the frequency weighting is determined by the pass characteristics of the band-pass filter. Given this, the most critical of the characteristics of the band-pass filter is the center frequency. Consequently, the wavelet transform (band-pass filter) that is applied in the individual band limiting portions 517 and 518 is preferably identical to that which was used at the time that the image was stored; however, it need not strictly be identical. As long as the scale parameter a (the center frequency) is identical, then the other characteristics, such as the width of the pass band, and like, may be mutually different between the band limiting portions 517 and 518, and need not be the same as those at the time of storage. Fundamentally, at the time of storage and at the time of collation, the characteristics need not be strictly identical between the band limiting portions 314 and the band limiting portions 517 and 518, and some degree of error in the characteristics is tolerable.

The peak detecting portion 52 outputs the correlation peak based on the pattern (function) of the normalized cross-correlation obtained from the correlation calculating portion 519. For the case of image collation, a determination is made as to whether or not the peak value exceeds a specific threshold value. In the case of position offset detection, the detected peak position is the estimated value for the position offset.

Figure 17:
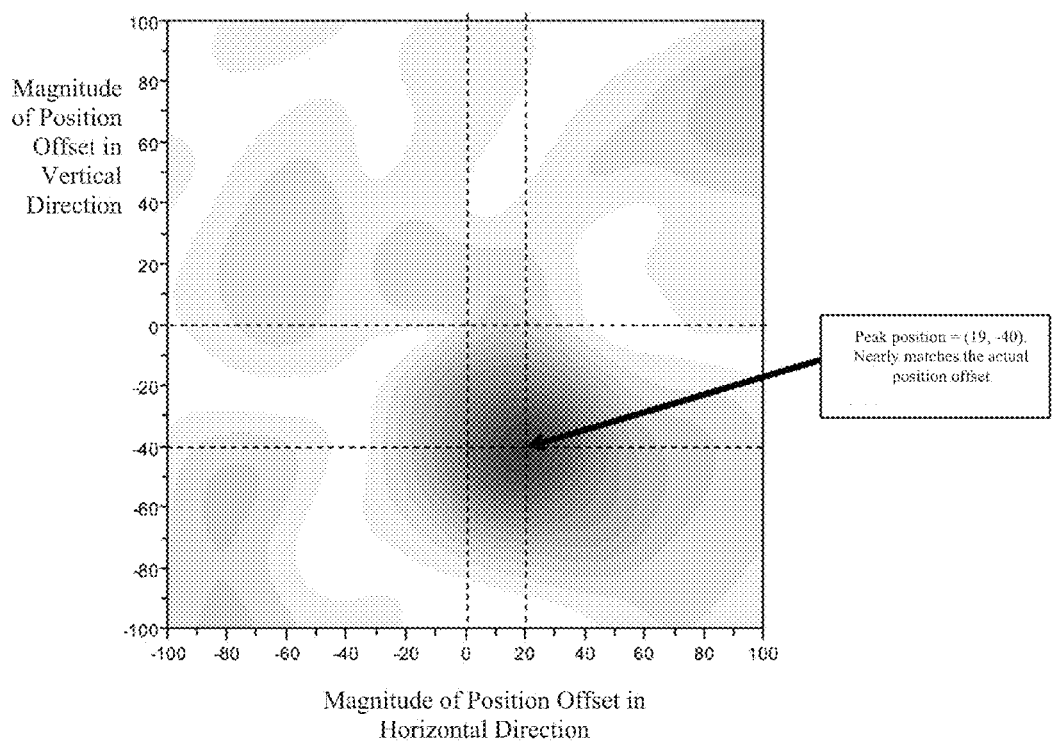
FIG. 17 is a diagram illustrating schematically one example of a normalized correlation pattern obtained when the scale parameter a is appropriate (a=10) in the image collating device illustrated in FIG. 14.

FIG. 17 illustrates an example of a correlation pattern calculated with a scale parameter of a=10. As is illustrated in FIG. 17, the position wherein the correlation pattern exhibits the maximum value is the coordinate location indicated by (19, −40), which can be seen to be essentially identical to the actual position.

Figure 18:
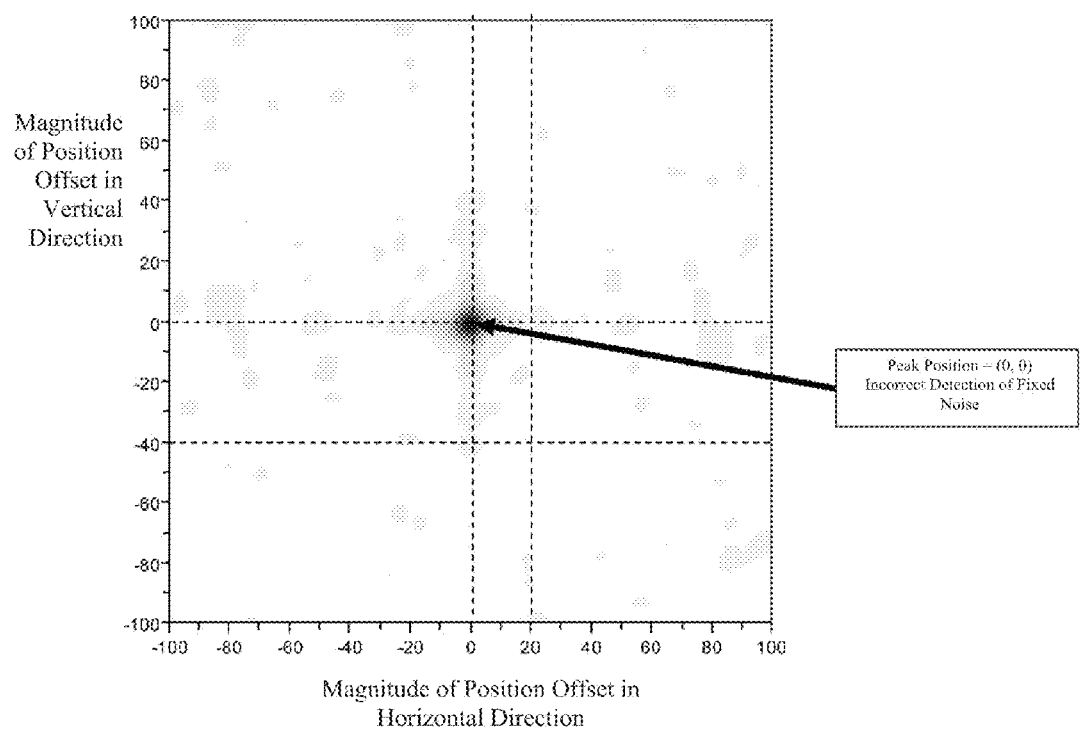
FIG. 18 is a diagram illustrating schematically one example of a normalized correlation pattern obtained when the scale parameter a is inappropriate (a=1) in the image collating device illustrated in FIG. 14.
Figure 19:
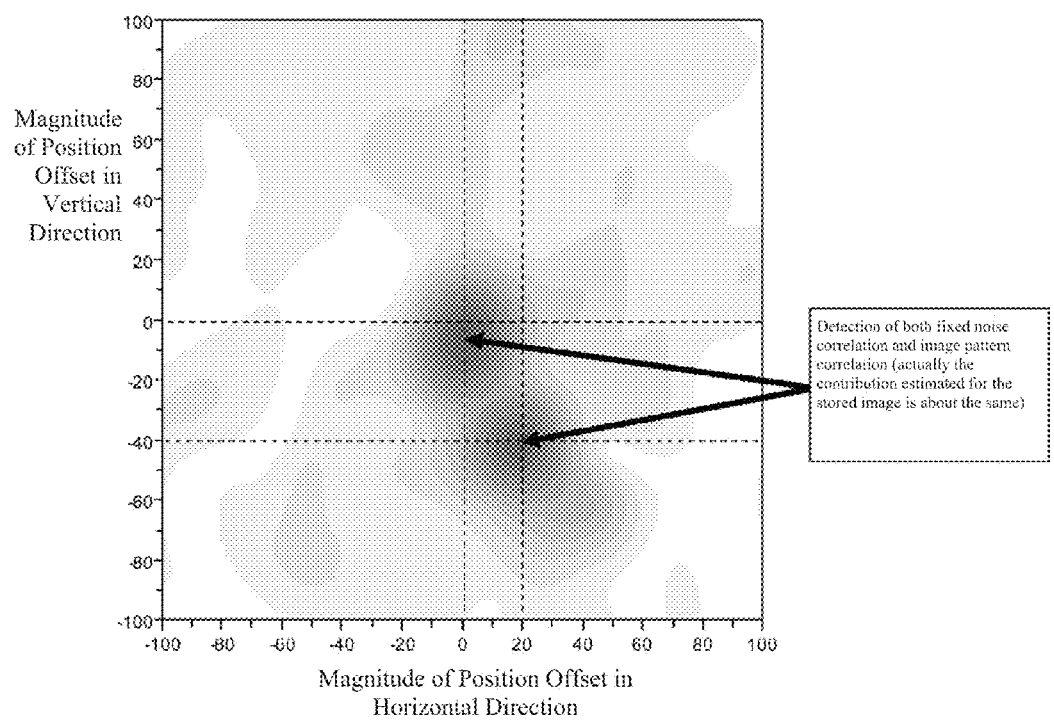
FIG. 19 is a diagram illustrating schematically one example of a normalized correlation pattern obtained when the scale parameter a is inappropriate (a=7) in the image collating device illustrated in FIG. 14.
Figure 20:
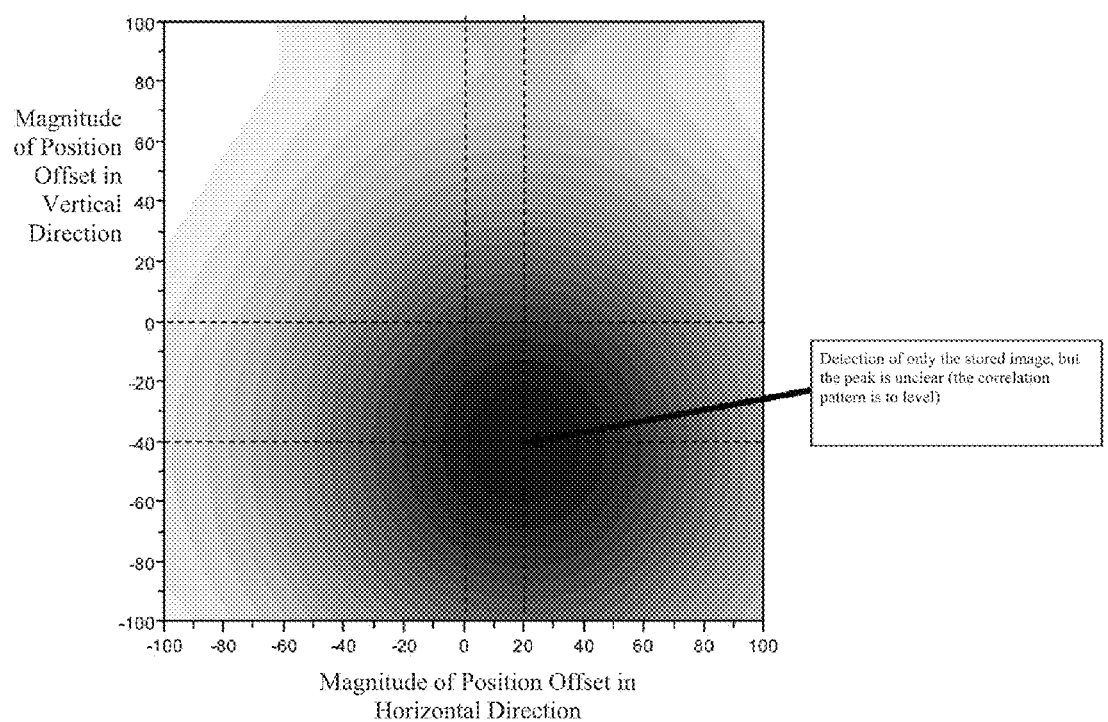
FIG. 20 is a diagram illustrating schematically one example of a normalized correlation pattern obtained when the scale parameter a is larger than the appropriate value (a=30) in the image collating device illustrated in FIG. 14.
Figure 21:
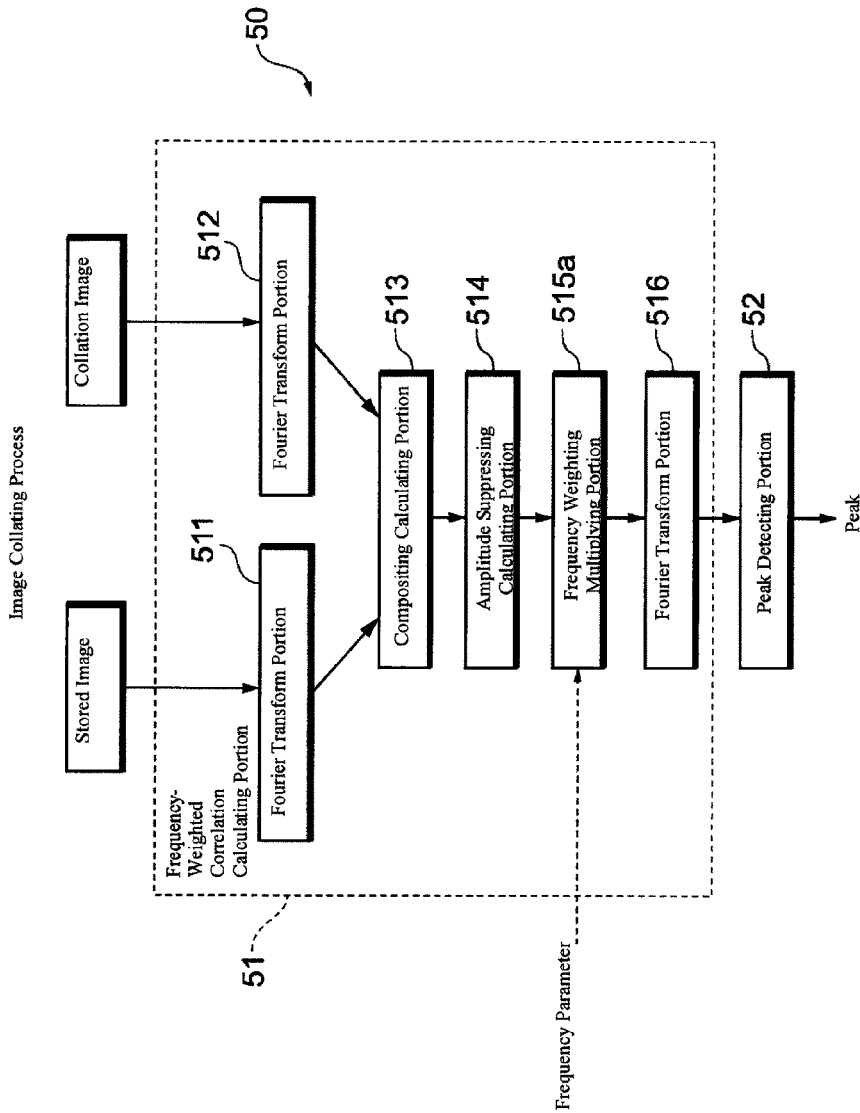
FIG. 21 is a block diagram illustrating a Specific Example 3 of the image collating device illustrated in FIG. 2.

Note that as a comparative example, FIG. 18, FIG. 19, and FIG. 20 each illustrate examples of correlation patterns (normalized cross-correlations) obtained when the scale parameter a is not appropriate. Note that in each, the darker the portion in the grayscale, the greater the correlation.

FIG. 18 illustrates an example of the correlation obtained in the case wherein the scale parameter a is too small (a=1) in relation to the appropriate scale parameter a (=10). In this case, the correlation is calculated in the high-frequency range wherein the influence of the fixed pattern noise is large, and thus there is a tendency to detect the peak position due to autocorrelation with the fixed pattern noise (that is, the origin (0, 0)) incorrectly as the position corresponding to the actual offset, and thus the detection accuracy for the position offset is low when compared to a=10.

FIG. 19 illustrates an example of the correlation pattern obtained when a=7, as an example of 1<a<10. In this case, the fixed pattern noise powers and the stored image powers rival each other, and thus strong correlations are seen for both the point corresponding to the actual offset and the position due to the autocorrelation with the fixed pattern noise (the origin). As a result, it is difficult to distinguish between the correlation with the fixed pattern noise and the correlation with the image pattern, causing the accuracy of the detected image collation and position detection to fall relative to a=10.

FIG. 20 illustrates an example of a correlation pattern obtained in the case of the scale parameter being too large (a=30). As illustrated in FIG. 20, the correlation pattern in this case is indistinct when compared to FIG. 17, and the peak position is unclear. Because of this, there is the risk of a reduction in detection resolution in image offset detection.

As described above, there will be a reduction in the accuracy of the image collation and of the position offset detection regardless of whether the scale parameter a used in the collation process is too high or too low. Consequently, preferably an appropriate scale parameter a is selected in the image storing process using a method such as described.

Note that while the Specific Examples 1 and 2 were based on the same technical concept, the frequency component analysis method and method for applying the weighting function were different. In the Specific Examples 1 and 2, a Fourier transform process was used to perform a two-dimensional frequency analysis, and the powers of the stored image and of the blank image were compared at each point in the frequency domain. Moreover, the frequency-weighting function may also be determined in detail as a two-dimensional pattern. (See, for example, FIG. 10.)

In contrast, in the Specific Example 2, the frequency component analysis is performed compressed into a single dimension through compressing into a single scale parameter a. The frequency weightings may also be varied by varying these scale parameters a. Because of this, the frequency weighting adjustments (control) can be simplified when compared to Specific Example 1. While there is the possibility that the collating performance and position offset detection accuracy may suffer when compared to the Specific Example 1, as a result of this simplification into a single parameter, this is a useful method when the benefits obtained through the simplification of control are greater, or when within the tolerable range in regards to the required performance and accuracy.

Note that while in Specific Example 2 a wavelet transform was used in the analysis of the frequency components of the image, there is not necessarily any limitation to a wavelet transform. For example, a band-pass filter wherein the center frequency of the pass band may be varied may be used instead of the wavelet transform, to obtain an equivalent frequency component analysis.

Furthermore, while in the Specific Example 2 set forth above the frequency-weighted correlation was calculated through performing a correlation calculation (for example, a normalized cross-correlation calculation) after the application of the band limiting processes to the stored image data and the collation image data, instead the frequency-weighted correlation may be calculated by performing the band limiting process after the correlation calculation.

Specific Example 3

Combination of the Wavelet Correlation and the Phase-Only Correlation

While in the collation process in Specific Example 28 frequency-weighted normalized cross-correlation (function) was used, this may be substituted for a method based on the phase-only correlation method (Specific Example 1). Consequently, the image storing process in the present example may be identical to that in Specific Example 2. (See, for example, FIG. 13.) Moreover, the stored image, the blank image, and the collation image are also identical to the respective images in Specific Example 1.

In this case, the frequency-weighted correlation calculating portion 51 is provided with Fourier transform portions 511, 512, and 516, the compositing calculation portion 513, and the amplitude suppressing calculating portion 514, identical, respectively, to those illustrated in Specific Example 1 (FIG. 6), and also provided with a frequency weighting multiplying portion 515a. The frequency weighting multiplying portion 515a multiplies the frequency weightings, corresponding to the scale parameter a determined in the image storing process in Specific Example 2, by the output of the amplitude suppressing calculating portion 514.

In Specific Example 2, described above, the powers of the stored image and of the blank image were compared for various scale parameters a, and the smallest scale parameter a for which the ratio of these two powers exceeded a specific threshold value was selected (determined) by the frequency parameter determining portion 32a. The scale parameter selected in this way is indicated by a0, below.

The wavelet transform can be considered to be a type of band-pass filter, as described above. When the center frequency of the analyzing wavelet is defined as $\omega_0$, then the continuous wavelet transform with the scale parameter as a can be considered to be a band-pass filter wherein the center frequency is $\omega_0/a$. (See, for example, Tetsuya Tahara, (edited by Seiichi Arai and Kazushi Nakano), "Industrial Applications of Wavelet Analysis," Asakura Shoten, p. 9 to 10 (2005).)

The analyzing wavelet (Garbot function) used in Specific Example 2 used $\omega_0$ as the center frequency in both the horizontal direction and the vertical direction, and thus the continuous wavelet transform wherein the scale parameter was $a_0$ was equivalent to the application of a band-pass filter wherein the center frequency was $\omega_0/a_0$ in both the horizontal direction and in the vertical direction.

That is, the scale parameter $a_0$ corresponds to a frequency of $\omega_0/a_0$. Consequently, frequencies that are higher than the frequency $\omega_0/a_0$ are frequencies wherein the effect of the fixed pattern noise is strong, and thus should be suppressed by the frequency weighting (function). On the other hand, frequencies that are lower than the frequency $\omega_0/a_0$ are frequencies wherein the power in the stored image is adequately strong when compared to the power of the fixed pattern noise, and thus it is okay if the weighting function is large. In other words, frequency weighting corresponding to a low pass filter with a cutoff frequency of $\omega_0/a_0$ can be considered to be appropriate.

As one non-limiting example of a weighting function based on this type of rule there is the function wherein frequencies, both horizontal and vertical, higher than $\omega_0/a_0$ have a weighting of 0, as illustrated in Equation (3.1), below. Note that $\omega_x$ and $\omega_y$ indicate, respectively, frequencies in the horizontal and vertical directions.

Equation 3.1

$$W_{tmp}(\omega_x, \omega_y) = \begin{cases} 0, & |\omega_x| > \omega_0/a_0 \text{ or } |\omega_y| > \omega_0/a_0 \\ 1, & \text{otherwise} \end{cases} \quad (3.1)$$

Moreover, as another example, as is illustrated in the Equation (3.2), below, there is the function wherein the weightings are 0 outside of the circle passing through $(\omega_x, \omega_y)=\omega_0/a_0, 0)$ and $(\omega_x, \omega_y)=(0, \pm\omega_0/a_0)$ (that is, high frequencies)

Equation 3.2

$$W_{tmp}(\omega_x, \omega_y) = \begin{cases} 0, & \omega_x^2 + \omega_y^2 > (\omega_0/a_0)^2 \\ 1, & \text{otherwise} \end{cases} \quad (3.2)$$

Furthermore, while in the example listed above the weightings change discontinuously at the border of the circle that passes through $(\omega_x, \omega_y)=(\pm\omega_0/a_0, 0)$ and $(\omega_x, \omega_y)=(0, \pm\omega_0/a_0)$, a sigmoid function (shown in, for example, FIG. 9) may be used, as illustrated in Specific Example 1, to vary the weightings continuously, as illustrated in the Equation (3.3), below.

Equation 3.3

$$W_{tmp}(\omega_x, \omega_y) = 1 - \frac{1}{1 + \exp(-5((\omega_x^2 + \omega_y^2) - (\omega_0/a_0)^2))} \quad (3.3)$$

Figure 22:
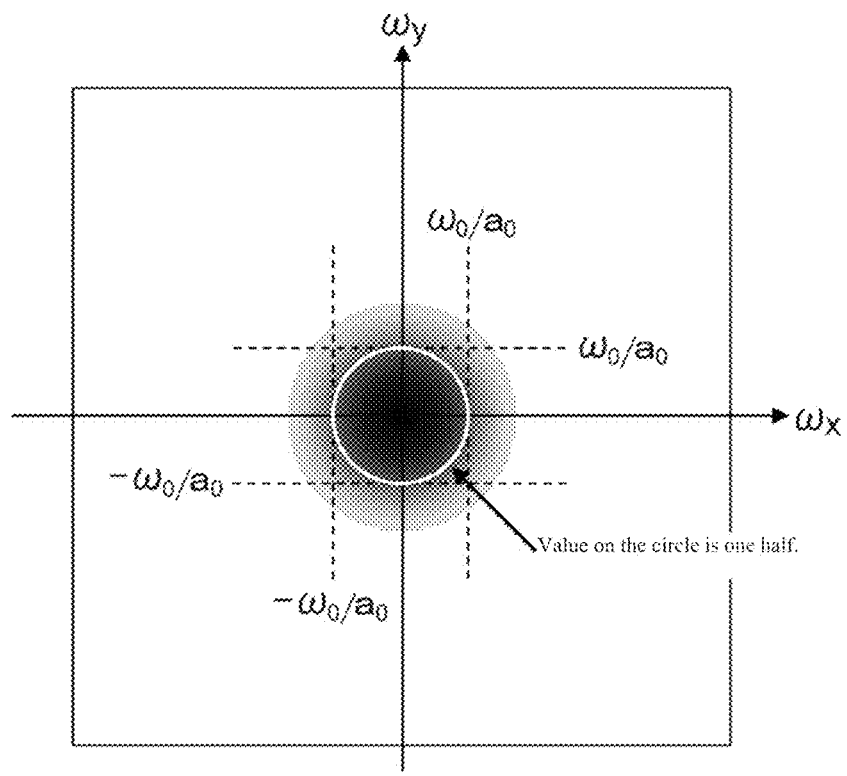
FIG. 22 is a diagram illustrating an example of frequency weighting (a sigmoid function) used in the image collating device illustrated in FIG. 21.

That is, as illustrated in, for example, FIG. 22, frequency weightings may be applied (in a low pass filter) using a concentric circle sigmoid function such as wherein the value falls to one half on the circumference that passes through $(\omega_x, \omega_y)=(\pm\omega_0/a_0, 0)$ and $(\omega_x, \omega_y)=(0, \pm\omega_0/a_0)$. When compared to the weighting function illustrated in Specific Example 1 (shown in FIG. 10), it can be seen that there is the same general tendency for the weightings to be higher at the low frequencies (near the center) and the weightings to be lower at the high frequencies (near the edges). On the other hand, the weighting function in the present method is a concentric circle, and is simpler than the weighting function in Specific Example 1. In practice, there is only a single variable parameter, as was the case in Specific Example 2, thus making it possible to simplify the weighting adjustments (control), in the same manner as in Specific Example 2.

The frequency weighting multiplying portion 515a in the present example performs normalization, using the same method as in Specific Example 1 (referencing Equation (1.5)) on the frequency weightings (weighting function pattern) indicated by any of, for example, Equation (3.1), (3.2), or (3.3), described above, and the normalized frequency weightings are multiplied, in the amplitude suppressing calculating portion 514, by the pattern data $Q(\omega_x, \omega_y)$ wherein the amplitude components are suppressed, to produce the frequency-weighted phase-only correlation pattern data.

The peak detecting portion 42 outputs a correlation peak based on the phase-only correlation pattern data obtained by the frequency weighting multiplying portion 515a. In the case of image collation, an evaluation is made as to whether or not the peak value exceeds a specific threshold value. In the case of position offset detection, the detected peak value is used as the estimated value for the position offset.

Figure 23:
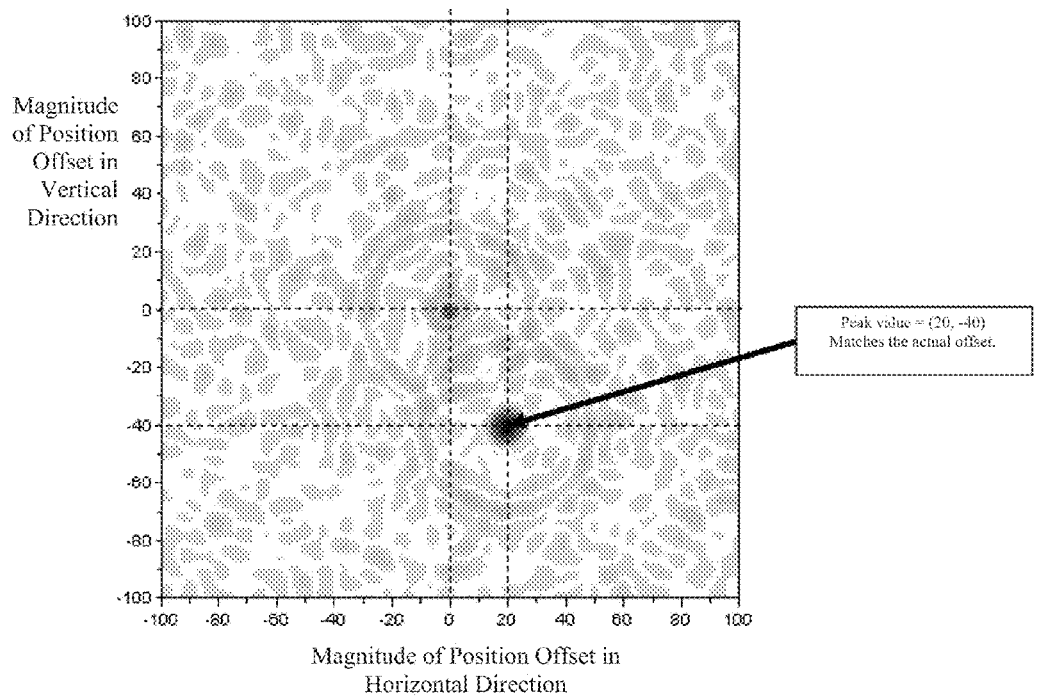
FIG. 23 is a diagram illustrating schematically one example of a correlation pattern obtained through the image collating device illustrated in FIG. 21.

FIG. 23 illustrates an example of the frequency-weighted phase-only correlation pattern data that is obtained. The correlation peak value is at (20, −40), producing a result corresponding to the actual position offset. Note that in FIG. 23, the darker the grayscale portion, the higher the correlation.

The invention claimed is:

1. An image processing device comprising:
 an estimating portion that estimates, based on first image data obtained through imaging, using an imaging device, a first image that includes a specific image pattern, and based on second image data obtained by imaging, using the imaging device, a second image that does not include the specific image pattern, a frequency component of noise that is included in both the first and second images, and a frequency component of a first image that does not include the noise; and
 a controlling portion that controls weightings, relative to frequencies, when calculating a correlation between the first image data and third image data, obtained through imaging a third image through the imaging device, based on the individual frequency components estimated by the estimating portion,
 wherein the estimating portion comprises
  a first frequency component analyzing portion that analyzes a frequency component of the first image data,
  a second frequency component analyzing portion that analyzes a frequency component of the second image data, and
  a subtracting portion that subtracts the analysis result by the second frequency component analyzing portion from the analysis result by the first frequency component analyzing portion,
 wherein the controlling portion controls the weighting based on the subtracting result by the subtracting portion and on the analysis result by the second frequency component analyzing portion,
 wherein the first and the second frequency component analyzing portions each comprise
  a band limiting portion that applies a variable-frequency band limiting process to the input image data; and
  a sum-of-squares calculating portion that calculates a sum of squares of a band limiting result by the band limiting portion,
 wherein the control of the weightings by the controlling portion selects a maximum frequency wherein a ratio of the sum-of-squares result by the sum-of-squares calculating portion exceeds a specific threshold value as a reference frequency for the band limiting process that is performed in the process of calculating a frequency-weighted correlation of the first and third image data.

2. The image processing device as set forth in claim 1, wherein the band limiting process by the band limiting portion is a wavelet transform process.

* * * * *